(12) United States Patent
Goss et al.

(10) Patent No.: US 9,170,971 B2
(45) Date of Patent: Oct. 27, 2015

(54) FABRIC DISCOVERY FOR A CLUSTER OF NODES

(71) Applicant: III Holdings 2, LLC, Wilmington, DE (US)

(72) Inventors: Kenneth S. Goss, Round Rock, TX (US); Daniel M. Nold, Austin, TX (US); Sumedh Sathaye, Austin, TX (US); Mark B. Davis, Austin, TX (US); George R. Blair, Killeen, TX (US)

(73) Assignee: III Holdings 2, LLC, Wilmington, DE (US)

( * ) Notice: Subject to any disclaimer, the term of this patent is extended or adjusted under 35 U.S.C. 154(b) by 183 days.

(21) Appl. No.: 13/726,964

(22) Filed: Dec. 26, 2012

(65) Prior Publication Data

US 2014/0181573 A1  Jun. 26, 2014

(51) Int. Cl.
*G06F 13/40* (2006.01)
*H04L 12/701* (2013.01)
*H04L 12/933* (2013.01)
*H04L 12/751* (2013.01)

(52) U.S. Cl.
CPC ............. *G06F 13/40* (2013.01); *H04L 45/00* (2013.01); *H04L 45/02* (2013.01); *H04L 49/10* (2013.01)

(58) Field of Classification Search
USPC ............. 370/254, 255, 328, 449; 710/38, 104
See application file for complete search history.

(56) References Cited

U.S. PATENT DOCUMENTS

| | | | |
|---|---|---|---|
| 2004/0003111 A1* | 1/2004 | Maeda et al. | 709/237 |
| 2008/0056126 A1* | 3/2008 | Park et al. | 370/230 |
| 2011/0103391 A1* | 5/2011 | Davis et al. | 370/400 |
| 2014/0171069 A1* | 6/2014 | Pang et al. | 455/432.1 |
| 2014/0181573 A1* | 6/2014 | Goss et al. | 714/5.11 |

* cited by examiner

Primary Examiner — Benjamin H Elliott, IV

(57) ABSTRACT

Implementations of discovery functionalities in accordance with the present invention are characterized by being exceptionally minimalistic. A primary reason and benefit for such minimalistic implementations relate to these discovery functionalities being implemented via a management processor and associated resources of a system on a chip (SoC) unit as opposed to them being implemented on data processing components of a cluster of nodes (i.e., central processing core components). By focusing on such a minimalist implementation, embodiments of the present invention allow discovery functionalities to be implemented on a relatively low-cost low-power management processor coupled to processing cores that provide for data serving functionality in the cluster of nodes.

27 Claims, 14 Drawing Sheets

FABRIC DISCOVERY FOR A CLUSTER OF NODES

BACKGROUND

1. Field of the Invention

Embodiments of the present invention relate to discovery functionalities for a cluster of nodes. More specifically, embodiments of the present invention relate to methods and systems for determining a suitable routing configuration for a fabric of a cluster of server on a chip (SoC) nodes that integrate processing and networking resources and for maintaining that routing configuration, associated network information, and the like.

2. Description of Related Art

Various forms of networks having a plurality of associated data processing nodes are well known. For optimal performance, usability, and reliability in such networks, it is important that there is a means to quickly and reliably determine efficient (e.g., least-cost) routes between nodes and between a node and entities outside the network. Furthermore, the status of routes needs to be maintained and adjusted over time to ensure continued performance and reliability in the face of errors or network congestion. These functionalities are broadly referred to herein as discovery functionalities.

Various approaches for addressing these discovery functionalities are well known. However, these known approaches have been implemented in environments that have substantial resources (e.g., processor capability, available memory, etc) to apply to the challenges and requirements associated with providing these discovery functionalities. As a result of these substantial resources that are available, it is common for these known approaches to use system resources (e.g., networking resources) that would otherwise be available for processing user information to implement these discovery functionalities.

A network switch addresses these discovery functionalities from only the networking side such that valuable networking resources are consumed in order to address these discovery functionalities. When addressing these discovery functionalities with a network switch, there are typically considerable hardware resources available such as memory and hardware that is specifically configured for addressing these discovery functionalities. However, the situation also exists where there is a limited ability to interact with systems whose communication links are being assessed through the discovery functionalities. In this regard, addressing these discovery functionalities with a network switch has considerable limitations in that the network switch doesn't have a partner on the other side of a communication link but has significant available resources in the way of memory and discovery-specific hardware.

Server network interfaces that a network switch can interact with are very limited in how they can respond. Accordingly, this limits approaches available to a network switch for implementing discovery functionalities. Examples of these approaches for implementing discovery functionalities include the network switch filling in a routing table by sniffing packets on each port and identifying which network interfaces are connected on which port, loops being identified through the snooping when a given MAC address (i.e. network interface) is seen on multiple ports, loop avoidance through the network switch calculating a spanning tree based on its knowledge of MAC address vs. port and eliminating links that result in loops, resource loop detection/avoidance in cases where resource loops typically do not affect a switch, and, in the case of a plurality of interconnected clusters (i.e., referred to as super-clusters), multiple network domains discovering and interacting through multiple switches based on standard protocols for how switches will inform each other about their domains.

A cluster of traditional servers addresses these discovery functionalities with networking and processing elements. As such, when addressing discovery functionalities in a traditional cluster, server-side processing power and its network are used to perform discovery tasks such as establishing routing, detecting loops, and the like. More specifically, when a discovery agent is being run on each of the servers in the cluster, it is often required that all or a considerable portion of the cluster's resources are powered up in order to perform actions associated with the discovery functionalities. This is undesirable from the standpoints of power consumption and system resource utilization.

SUMMARY

In a cluster of data processing nodes, a node is a participating component that includes processing, management, and networking elements. For optimal performance, usability, and reliability, it is important that there is a means to quickly and reliably determine efficient least-cost routes between nodes and between a node and the outside network. The status of routes needs to be maintained and adjusted over time to ensure continued performance and reliability in the face of errors or network congestion.

Embodiments of the present invention are directed to the problems associated with discovery, maintenance, spanning tree computation, and recovery of routing (i.e., discovery functionalities) between Server on a chip (SoC) nodes (i.e., SoC units) and between a particular SoC node and an associated outside network. Addressing these discovery functionalities in the context of SoC nodes presents new opportunities and challenges. In the case of a SoC node, these discovery functionalities are implemented in an environment that is significantly constrained in regard to processing power, storage, and memory. By this, it is meant that management, processing, and networking functionalities are all performed within a common component (i.e., a single semiconductor chip). By being in the same component, a single entity such as software that manages functionalities of nodes can directly manipulate or support management, processing, and networking functionalities of each SoC node. The management element of an SoC node directly controls both the networking configuration for the processing side and the configuration of the external network of the SoC nodes (i.e. the fabric). This integrated connection between the management functionality, the networking functionality, and the processing functionality means that the network can be more efficiently established and managed and that the processing needs can be effectively and efficiently correlated with external network resources (i.e., fabric resources).

To this end, implementations of discovery functionalities in accordance with the present invention are characterized by being exceptionally minimalistic. A primary reason and benefit for such minimalistic implementations relate to these discovery functionalities being implemented via a management processor and associated resources of a SoC node as opposed to them being implemented on data processing components of a cluster of nodes (i.e., central processing core components). By focusing on such a minimalist implementation, embodiments of the present invention allow discovery functionalities to be implemented on a relatively low-cost low-power management processor coupled to processing cores that provide for data serving functionality in the cluster of nodes.

In one embodiment, a data processing system comprises a plurality of interconnected system on a chip (SoC) units that are each a data processing node within the data processing system, each one of the SoC units comprising one or more processing cores, one or more peripheral element interfaces coupled to the one or more processing cores, one or more external ports for allowing communication of information between the one or more processing cores and other ones of the data processing nodes, a switching fabric coupled between each one of the one or more processing cores, and a management engine coupled to the fabric switch and to each one of the one or more processing cores. The management engine includes one or more management processors, memory accessible by the one or more management processors, and instructions residing on the memory for being processed by the one or more management processors. The instructions are configured for causing the one or more management processors to generate depth chart entries for enabling routing of information to each other one of the data processing nodes.

In another embodiment, a system on a chip (SoC) unit intended to be used as one instance of a plurality of instances of SoC nodes arranged as a cluster of SoC nodes comprises one or more processing cores for processing information for one or more client systems and a management engine coupled to the one or more processing cores. The management engine includes one or more management processors, memory accessible by the one or more management processors, and instructions residing on the memory for being processed by the one or more management processors. The instructions are configured for causing the one or more management processors to determine routing information for neighbor nodes within the cluster of nodes, to receive neighbor node routing information from other ones of the nodes and to use the neighbor routing information to generate a depth chart containing routing information for each other one of the nodes in the cluster.

In another embodiment, a method is performed by each one of a plurality of nodes of a cluster for generating routing information to each other one of the nodes of the cluster. The method comprises an operation for generating a neighbor depth chart thereof, an operation for propagating entries of the node depth chart thereof for reception by neighbors of the particular one of the nodes, and an operation for creating a cluster depth chart for each one of the nodes using the node depth chart entries received thereby. The cluster depth chart is an aggregation of the node depth chart entries for the particular one of the nodes and depth chart entries received by the particular one of the nodes from other ones of the nodes. The method can be implemented by one or more management processors of a respective one of the nodes of the cluster accessing, from memory allocated to the one or more management processors of the particular one of the nodes, instructions for carrying out the operations.

In another embodiment, A non-transitory computer-readable medium has tangibly embodied thereon and accessible therefrom a set of instructions interpretable by one or more data processing devices. The set of instructions is configured for causing the one or more data processing devices to implement operations for generating a neighbor depth chart thereof, propagating entries of the node depth chart thereof for reception by neighbors of the particular one of the nodes, and creating a cluster depth chart for each one of the nodes using the node depth chart entries received thereby. The cluster depth chart is an aggregation of the node depth chart entries for the particular one of the nodes and depth chart entries received by the particular one of the nodes from other ones of the nodes.

These and other objects, embodiments, advantages and/or distinctions of the present invention will become readily apparent upon further review of the following specification, associated drawings and appended claims.

DETAILED DESCRIPTION

Figure 1:
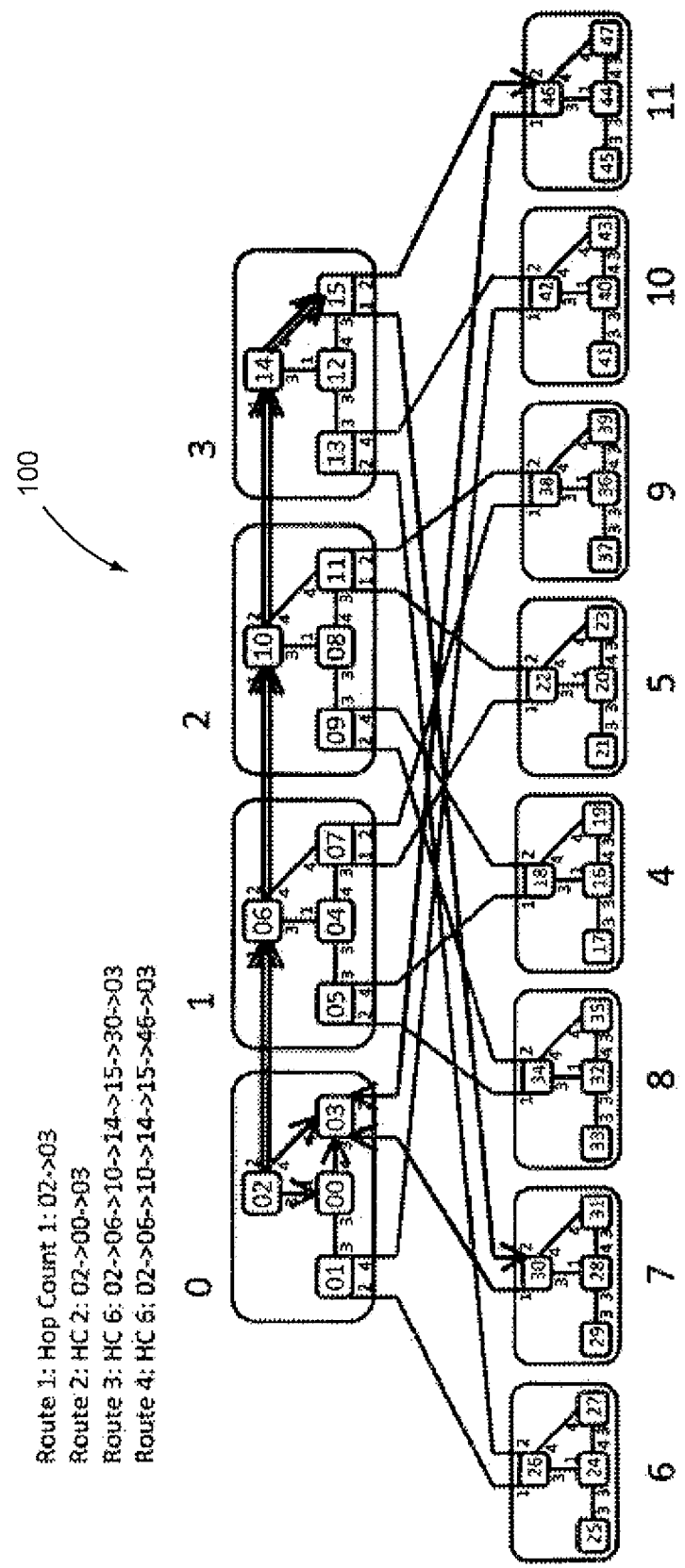
FIG. 1 shows node-to-node route information for a multi-node cluster configured in accordance with an embodiment of the present invention.

In view of the disclosures made herein, a skilled person will appreciate that the expected environment for embodiments of the present invention does not anticipate a given or typical layout of nodes within a fabric. The set of connections (i.e., links) between SoC nodes within the cluster is one example of and is referred to herein as a fabric (i.e., node interconnection structure). The mechanisms involved in implementing embodiments of the present invention need to be able to support configurations that change with nodes coming and going, being discovered, configured, included in routes, and then lost with necessary recovery to routes that used the node. These mechanisms must also allow customer configuration of aspects of the environment including not using some links (e.g., perhaps for power reasons) and networking configuration while also supporting default options when the configuration extends beyond what a customer has configured.

Embodiments of the present invention are directed to determining preferred (e.g., efficient and effective) routing and to maintaining that routing and necessary associated network configuration within a cluster of SoC nodes that integrate processing and networking resources within a common component (i.e., a single semiconductor chip). An important aspect of embodiments of the present invention is that, while establishing and maintaining an efficient fabric is crucial to the proper functioning of a fabric-based cluster of SoC nodes, this task is largely overhead from the perspective of a client who sees the cluster of SoC nodes as a set of resources upon which to run their applications. Advantageously, embodiments of the present invention address discovery functionalities (e.g., discovery, maintenance, spanning tree computation and recovery of routing) with a minimum amount of system resources. Embodiments of the present invention also advantageously use resources that are already available in SoC nodes of the cluster and that have a minimal if not negligible impact on data processing resources on which client applications are run (e.g., central processing unit (CPU) cores of a SoC node).

As will be discussed below in greater detail, a management engine of a SoC node is an example of a resource available in (e.g., an integral subsystem of) a SoC node of the cluster that has a minimal if not negligible impact on data processing performance of the CPU cores. For a respective SoC node, the management engine has the primary responsibilities of implementing intelligent platform management interface (IPMI) system management, dynamic power management, and fabric management (e.g., including one or more types of discovery functionalities). It is disclosed herein that a server on a chip is one implementation of a system on a chip and that a system on a chip configured in accordance with the present invention can have a similar architecture as a server on a chip (e.g., management engine, CPU cores, fabric switch, etc) but be configured for providing one or more functionalities other than server functionalities.

The management engine comprises one or more management processors and associated resources such as memory, operating system, SoC node management software stack, etc. The operating system and SoC node management software stack are examples of instructions that are accessible from non-transitory computer-readable memory allocated to/accessible by the one or more management processors and that are processible by the one or more management processors. A non-transitory computer-readable media comprises all computer-readable media (e.g., register memory, processor cache and RAM), with the sole exception being a transitory, propagating signal. Instructions for implementing embodiments of the present invention (e.g., functionalities, processes and/or operations associated with discovery, recovery, spanning tree computation, and the like) can be embodied as portion of the operating system, the SoC node management software stack, or other instructions accessible and processible by the one or more management processors of a SoC unit.

Each SoC node has a fabric management portion that implements interface functionalities between the SoC nodes. This fabric management portion is referred to herein as a fabric switch, which is discussed below in greater detail. In performing these interface functionalities, the fabric switch needs a routing table. The routing table is constructed when the system comprising the cluster of SoC nodes is powered on and is then maintained as elements of the fabric are added and deleted to the fabric. The routing table provides guidance to the fabric switch in regard to which link to take to deliver a packet to a given SoC node. In one embodiment of the present invention, the routing table is an array indexed by node ID. Each routing table entry has two bits for each of the five links (i.e., four (4) neighboring SoC node links plus one Ethernet link). For a given link, its routing table entry will have "3" if the destination node is an immediate neighbor, will have "2" if this is the best link that is not a direct route to the destination node, "1" if there is a path to the destination node but this is not the preferred path, and "0" if there is no path to the node on this link. It is the job of discovery code to fill in the routing table entries on each SoC node so that the fabric switch of each SoC node can efficiently route traffic through the fabric. The fabric switch actually allows each link to have its own routing table, but it is preferred for every link on a given node to be provided the same routing table.

FIG. 1 shows a cluster 100 of nodes (e.g., a plurality of SoC units each representing an instance of a node) configured in accordance with an embodiment of the present invention. As shown, the cluster 100 includes 48 individual nodes that are interconnected via a node interconnect fabric. Table 1 below is a routing table for routes 105 (shown in FIG. 1) from Node 2 to Node 3 of the cluster 100 of nodes.

TABLE 1

Node 2-to-Node 3 Routing Table

| Node Link No. For Node 2 | Route Rating |
| --- | --- |
| 0 | 0 (no route) |
| 1 | 0 (no route) |
| 2 | 1 (least optimal route) |
| 3 | 2 (optimal indirect route) |
| 4 | 3 (direct route) |

In regard to the routing table entry on Node 2 for destination Node 3, Node 2 has a direct connection to node 3 over its Link 4. Node 2 has a two-hop route to Node 3 via Node 0 over its Link 3 and has distant routes to Node 3 via its Link 2 (e.g., routes that bounce around much of the system before getting back to Node 3). Links 0 and 1 on Node 2 are not connected so Links 0 and 1 have routing table entries of 0 because there can be no route on those links because they are not connected. Link 2 has a routing table entry of 1 because while there are routes starting from that link, they are not preferred because they are long. Link 3 has a routing table entry of 2 because there is a reasonably good route to Node 3, but it is not a direct connection. Link 4 has a routing table entry of 3 because the connection to Node 3 on that link is direct. In this regard, the routing rating characterizes efficiency (e.g., no. of hops and thus associated server access cost) for traversing between a source node (e.g., Node 2 in FIG. 1) and a particular target node (e.g., Node 3 in FIG. 1). As shown, the rating can include a numeric ranking and/or a qualitative rating. As a skilled person will appreciate and understand from the following discussions, the routes 105 of FIG. 1 can be derived from depth chart entries of the nodes of cluster 100 and the routing ranking information of Table 1 can be derived from the routes.

A fabric switch configured in accordance with the present invention provides for multiple methods of directing packets above and beyond traditional Ethernet routing. Link-directed messages and node-encoded messages are two examples of these packet directing methods. In this regard, link-directed messages and node-encoded messages are networking resources that are referred to herein as networking primitives. Through use of these networking primitives, one or more discovery functionalities and associated aspects of SoC node configuration can advantageously be based on are based on a small number of networking resources within a SoC node (e.g., as embodied by a single SoC unit). Furthermore, along with these networking primitives, one or more discovery functionalities configured in accordance with the present invention preferably utilizes local processing, memory, and storage capacity of a management controller that is part of each SoC node. Specific to fabric maintenance, networking primitives, various network statistics that are made available by the SoC node hardware, and an event mechanism (e.g., either synchronous (status polling-driven) or asynchronous (interrupt-driven)) that is triggered by a link becoming disconnected are used for such fabric maintenance.

In regard to a link-directed message, hardware of a particular SoC node sends a message across a specified SoC node link (i.e., network interconnect) via the fabric switch of that particular SoC node. Link-directed messages can be sent to a neighbor on a specified link even if the destination's MAC address and node ID are unknown. A link-directed message is guided by a specially-formed MAC address that includes a destination link and MAC. Although a link-directed message can only go one hop in the fabric, it can be used for intimate conversations between immediate neighbors. These characteristics make link-directed messages ideal for implementing discovery in accordance with the present invention.

In regard to a node-encoded message, hardware of a particular SoC node sends a message to a specified target SoC node in the cluster as long as the target SoC node and all SoC nodes in between have a functional route to the specified node. It should be noted that node-encoded messaging can be simply implemented atop link-directed messaging using the same routing data gathered during discovery.

The expected environment for this invention does not anticipate a given or typical layout of nodes within a fabric. The mechanisms involved need to be able to support configurations that change with nodes coming and going, being discovered, configured, included in routes, and then lost with necessary recovery to routes that used the node. The mechanisms also must allow customer configuration of aspects of the environment including not using some links (perhaps for power reasons) and networking configuration while also supporting default options when the configuration extends beyond what a customer has configured.

Turning now to a discussion of implementing discovery (i.e., discovery of cluster nodes) in accordance with an embodiment of the present invention, to establish routing between SoC nodes of a cluster, each SoC node needs to devise a routing table (i.e., a map defining routing information of the SoC nodes) of how its links are arranged in the cluster. This routing table will indicate to a respective SoC node which link it should use to send (or forward) a message to a given destination SoC node. In order to build this routing table and to maintain connection between SoC nodes when a link or SoC node in the cluster node becomes disconnected, each SoC node must maintain a depth chart (i.e. a more detailed version of routing table) that indicates how all of the SoC nodes in the cluster are connected. The depth chart is an array on each SoC node that is indexed by destination SoC node. The depth chart keeps the information necessary to calculate the routing table such as, for example, the hop count to destination nodes on each link). It is disclosed herein that the routing table and/or the depth chart can be maintained in software or in hardware of a node.

The goal of discovery is to assess (e.g., prioritize and/or weight) links between SoC nodes in a cluster. Therefore, there is a fundamental need for a target SoC node to be able to identify the source of a given linked-directed message received from a SoC node that issued the given linked-directed message. Link neighbor discovery address the problem that a management engine of a given SoC node cannot determine on which link the SoC node a given message (e.g., a given linked-directed message) the has arrived on. In this regard, link neighborhood discovery is a first step in generating a routing table for a SoC node.

Figure 2:
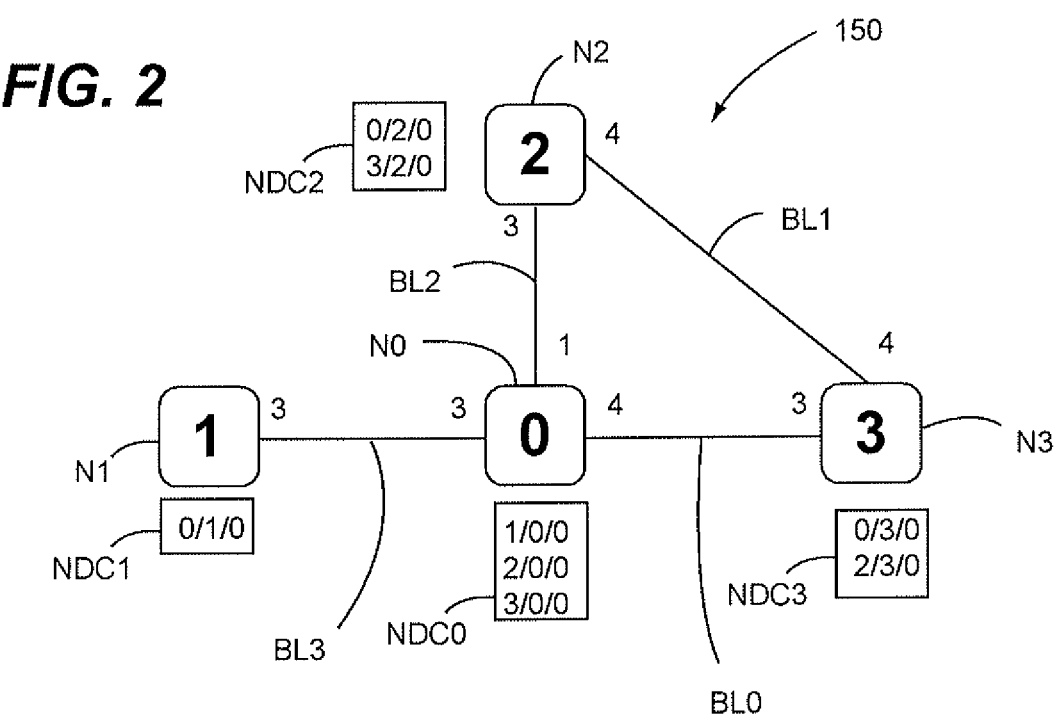
FIG. 2 shows a 4-node cluster configured in accordance with an embodiment of the present invention.

FIG. 2 shows a cluster of four (4) nodes N0-N3 (i.e., a four node cluster 150), which can each be an SoC node configured in accordance with an embodiment of the present invention. As shown in FIG. 2, each one of the nodes N0-N3 has depth chart associated therewith that defines information regarding only each neighbor node (i.e., neighbor depth charts NDC0-NDC3). Entries of neighbor node depth charts NDC0-NDC3 are in a format of target node/neighbor node/hop count (e.g., 0/2/0). The neighbor node identifier refers to the neighbor to the target node with respect to a node to which the depth chart corresponds (i.e., the source node). Thus, the source node can be the neighbor node when the target node is connected directly to the source node (i.e., a 1-hop node) and an immediately adjacent node (e.g., connected directly via a bidirectional link) is the neighbor node when the target node is more than one hop away. Each Node N0-N3 is connected to one of the other Nodes N0-N3 via a respective bidirectional link BL0-BL4. Link numbering at a given node is designated on a per-node basis as shown by the number where each one of the bidirectional link BL0-BL3 terminate at a given one of the Nodes N0-N3. For example, if Node N0 sends a link-directed message on bidirectional link BL1 for reception by Node N2, the link-directed message will be transmitted from node link 1 of Node N0 to node link 3 of Node N2. In this manner, if SoC Node N2 has established a routing table that tells it that Node N1 can best be reached via node link 3 of Node N2 and Node N0 has a routing table entry that indicates that Node N1 is on node link 3 of Node N0, Node N2 can send a node-encoded message that will be able to travel from Node N2 to Node N0 to Node N1 with minimal latency in delivery.

Figure 3:
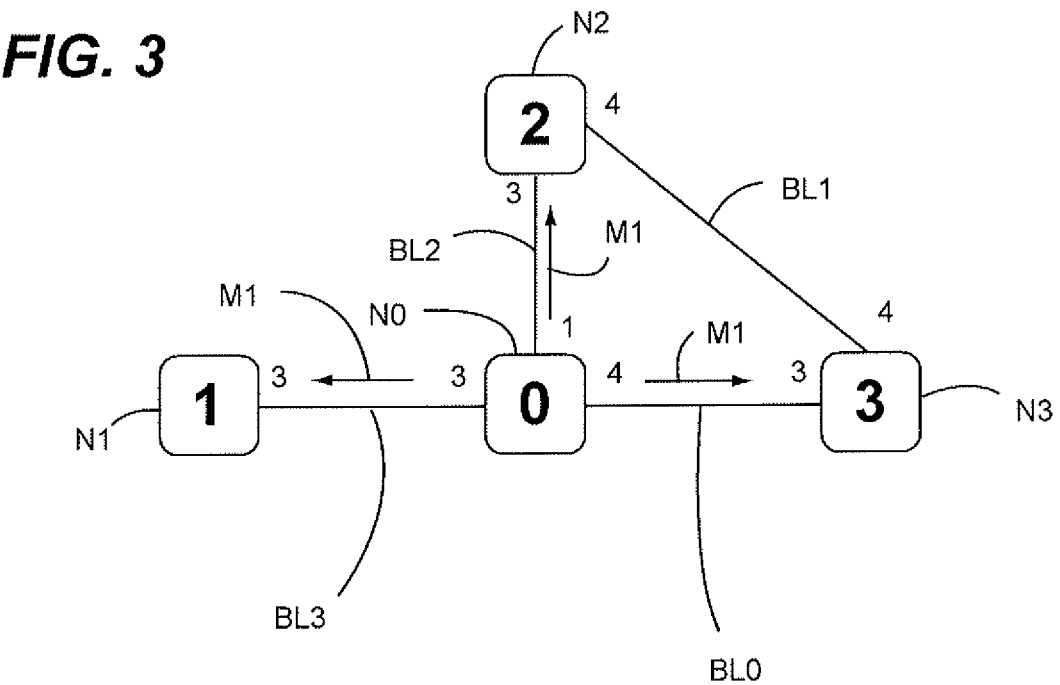
FIGS. 3-5 show aspects of implementing link neighbor discovery in accordance with an embodiment of the present invention.

The initial steps of discovery involve a three-step handshake between each node and each of its link neighbors, i.e. those nodes on the opposite ends of its links. These initial steps are jointly referred to as the link neighbor discovery process and produce the neighbor depth chart for each one of the Nodes N0-N3. A first phase of the three-phase handshake is link neighbor advertising (i.e., Link Neighbor Advert). As shown in FIG. 3, upon links of the Nodes N0-N3 being enabled, the management engine of each one of the Nodes N0-N3 sends out a link neighbor advertising message on each one of its associated links (e.g., link neighbor advertising message M1 from Node N0 on node links 1, 3, and 4) for reception by the management engine of each neighboring node. Each link neighbor advertising message includes its own node ID (e.g., N0) and the node link upon which it is being transmitted (e.g., node links 1, 3, and 4).

Figure 4:
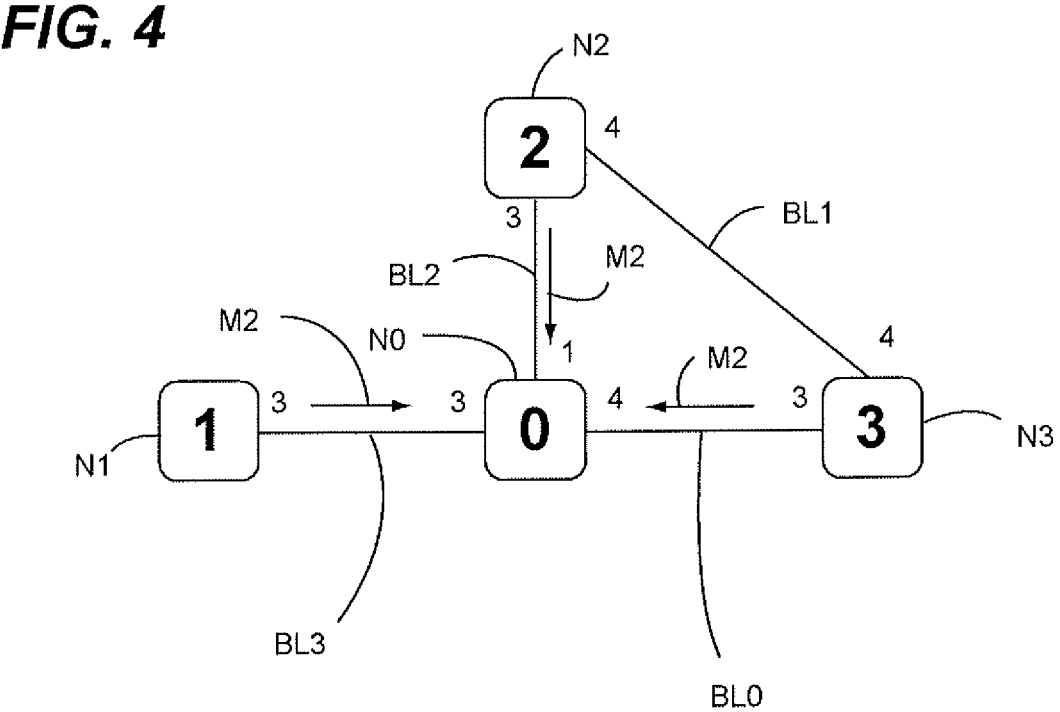

When the management engine of each one of the neighboring nodes receives the link neighbor advertising message from another one of the nodes, the management engine of the receiving node responds by sending out a link neighbor response message on every one of its node links (e.g., link neighbor response message M2 from Node N3 on node links 3 and 4). In this regard, the node receiving the link neighbor advertising message becomes a responding node. Each link neighbor response message designates the node and respective node link from which the initiating link neighbor advertising message was originally sent (i.e., the original node's id and node link#) and the node and respective node link sending the link neighbor response message (i.e., its own node id and node link#). The link neighbor response message has to be sent on each link of a node on which it was possible to have received the link neighbor advertising message because the management engine cannot tell on which one of links of the node received the link neighbor advertising message. For example, as shown in FIG. 4, SoC Node N2 would respond to Node N0's link neighbor advertising message on both node link 3 and node link 4 of SoC Node N2.

On receiving a link neighbor response message, a target node checks to see if it was the originating node of the handshake. If it was not, the target node discards the link neighbor response message. For example, in regard to FIG. 4, link neighbor response message sent between Nodes N2 and Node N3 would be discarded. Node N0, which is the target (i.e., originating) node, will receive three valid link neighbor response messages and from the message data will now know what neighbor is on the other end of each of its links. The target node will add an entry to its depth chart that specifies the originating node, the destination node, the link used to connect these nodes, and a distance (or hop count) of 0. A hop count of 0 indicates that the neighbor is reachable via a direct connection. The target node will also add to its routing table an indication that it has a 0 hop route to the neighboring node. Finally, the target node also tracks that it has a neighbor on this link and which neighbor that is.

Figure 5:
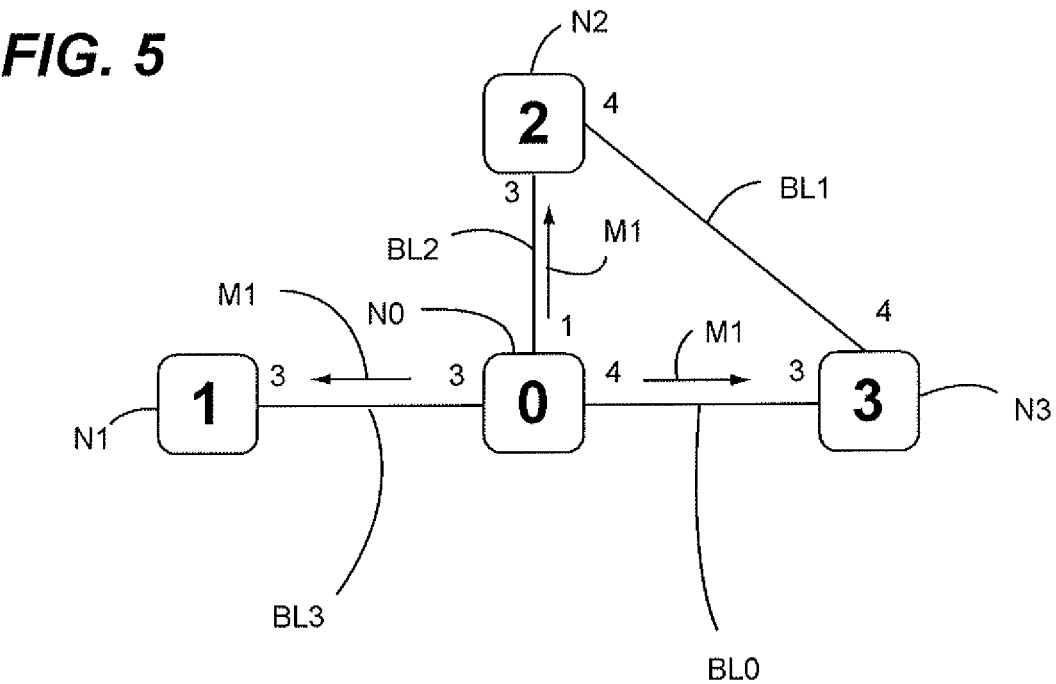

A node that sent a particular link neighbor advertising message should receive exactly one link neighbor response message to its particular link neighbor advertising message on each node link that has a neighbor. Because these link neighbor response messages include the responding node and the originating node link, the original node can now keep a data structure mapping node link to remote neighbor node (e.g., a data structure referred to as "link_list"). As shown in FIG. 5, the management engine of the node then sends back to each responding node a link neighbor acknowledgement message M3 so the responding node can know which of its responses lead to the originating node allowing it to fill in its own link_list. The link neighbor acknowledgement message M3 contains the same data as the link neighbor response message M2 (i.e. the node id and corresponding node link). This allows the neighboring nodes to know their link neighbors as well. As the originating node did above, the neighbor nodes can now add a depth chart entry and update their routing table indicating a 0 hop route to the originating node.

It should be noted that the link neighbor discovery process is started independently on both ends of a particular bidirectional link. All of the nodes initiate the link neighbor discovery process when they start. This is somewhat redundant if all of the nodes are starting at the same time, but having each node run through the process as the originating node prevents late-arriving nodes (e.g., delayed in being enabled) from missing out on the exchange of messages. Even if the rest of the system has been up for some time, a newly arriving node executing the handshake will be able to find out about its neighbors and inform them of its presence. This can lead to some redundancy as the nodes at each end of the particular bidirectional link could be sending link neighbor advertising messages, link neighbor response messages, and link neighbor acknowledgement messages on the bidirectional link. This is worthwhile however because it handles the frequent case where a remote node is not ready to receive when an initial (i.e., first) link neighbor advertising message is sent. When the remote node is finally ready, its sending of a link neighbor advertising message is enough to fully complete the exchange even though the initial link neighbor advertising message was lost.

Figure 6:
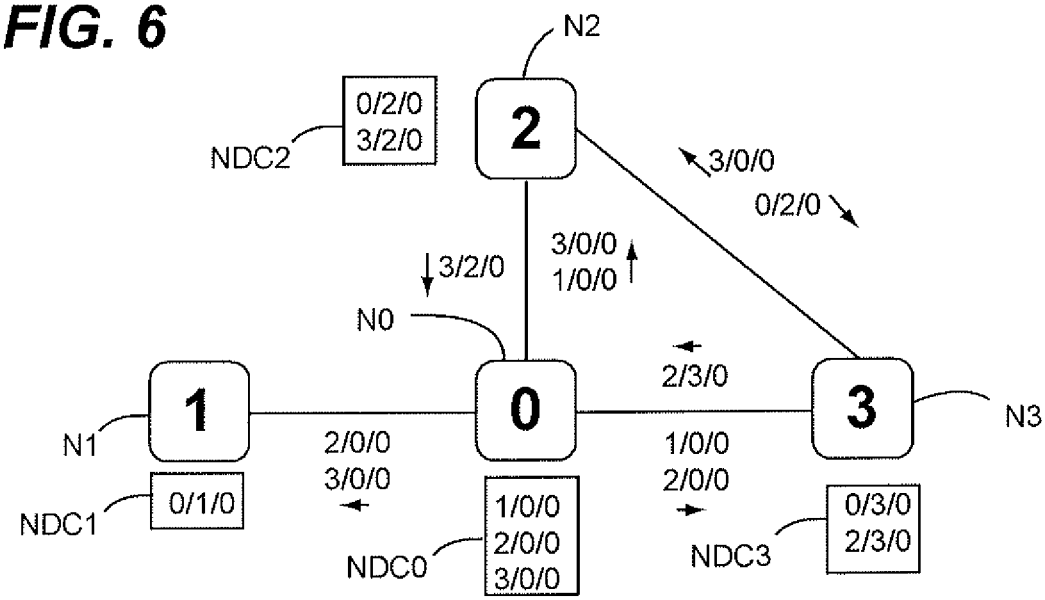
FIGS. 6-8 show aspects of implementing a depth chart entry propagation process in accordance with an embodiment of the present invention.
Figure 7:
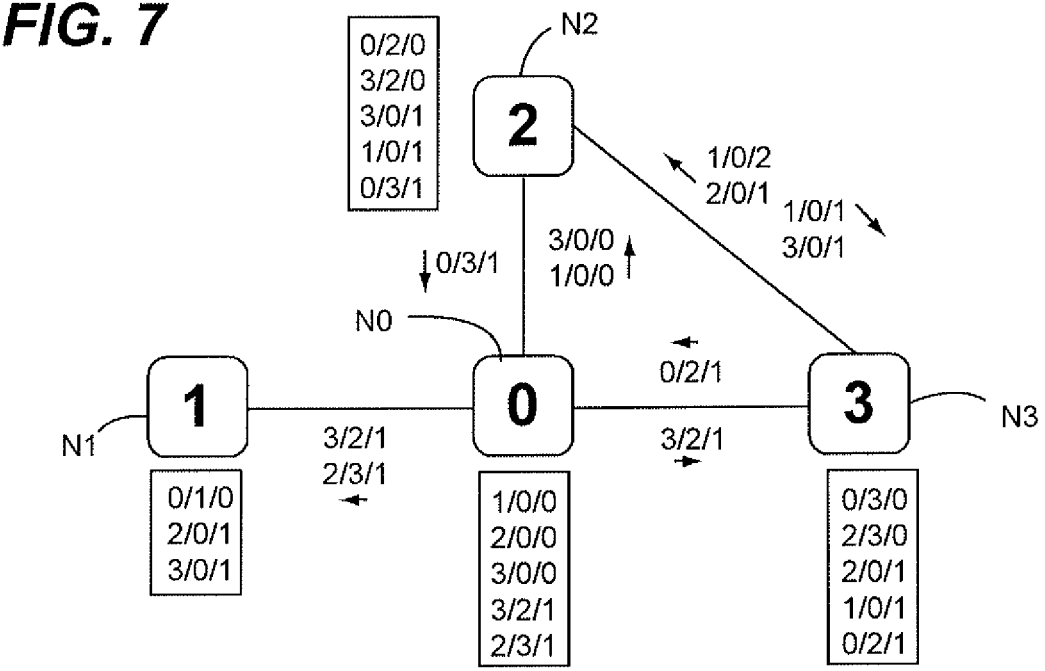
Figure 8:
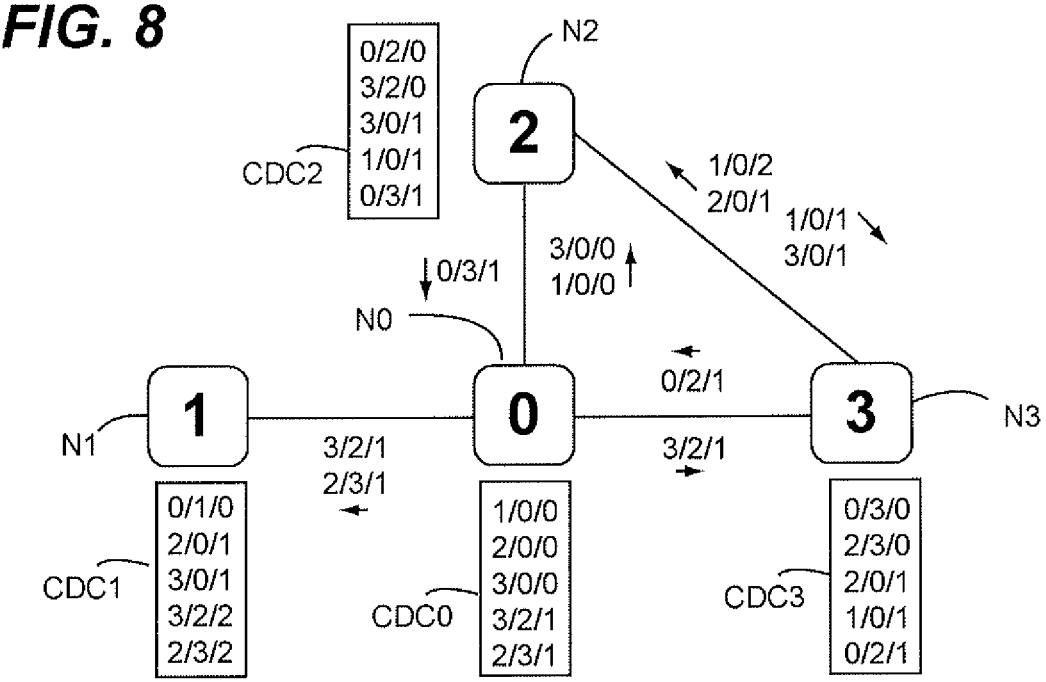

Following the link neighbor discovery process, a depth chart entry propagation process is performed for generating a cluster depth chart for each one of the nodes of the cluster (i.e., cluster depth charts CDC0-CDC3 shown in FIG. 7). This process begins with each node sending out on all of its node links the set of depth chart entries that it has recorded, as shown in FIG. 6. Entries received on a particular node link are not sent back out on that particular node link. Next, as shown in FIG. 7, each new entry of a particular node is propagated to its neighbors. As each entry is received by a particular node, it is only added to the depth chart of that particular node if it represents a new node/neighbor link representation or if it has a new lowest cost (i.e., hop count) for a given node/neighbor link representation. In this manner, the cluster depth charts CDC0-CDC3 shown in FIG. 7 are generated. As shown in FIG. 8, the depth chart entry propagation process is complete when a state is reached where there are no new depth chart entry updates to propagate. The resulting cluster depth chart of a particular one of the nodes is the aggregation of the node depth chart entries for the particular one of the nodes and depth chart entries of neighbors of the particular one of the nodes (i.e., neighbor nodes of the neighbors of the particular one of the nodes).

A node must tell its neighbors whenever it creates or learns of a new depth chart entry (i.e., the set of source node, target node, link, and hop count data) in the cluster (i.e., via a link neighbor advertising message). The node receiving the link neighbor response message or link neighbor acknowledgement message will send to its other neighbors a depth chart update message that indicates its own identity and any new depth chart entries it has learned about. This messaging process is referred to as a depth chart update process.

A node receiving a depth chart update message compares the new depth chart entry with its existing set of depth chart entries. If no matching entry already exists (with the same source/destination/link combination), the depth chart entry is added to the node's depth chart, with the hop count value incremented by 1 (reflecting the single hop taken to pass the data along to the receiving node). If an entry exists, then the hop count values for the new and existing entries are compared, and the existing entry is updated if the new depth chart entry provides a shorter route to the provided link. To reduce cycles in the depth chart, any entry with the source or destination node being the same as the receiving node is discarded. Once a new or updated depth chart entry has been processed, the target node for that entry must undergo a routing table update. This is done by using the existing entries in the depth chart to trace the path from the updated target node back to the current node, whereupon the link taken to reach that target node can be determined. Finally, the new or updated depth chart entry is flagged to indicate that the node needs to update its neighbor nodes about the modified entry. Depth chart update messages can be batched to reduce the number of messages being transferred during the discovery process.

Turning now to a discussion of implementing cluster routing recovery in accordance with an embodiment of the present invention, it is important to understand that once composed, a fabric must be maintained over time against nodes (e.g., a SoC node) or node links being removed, becoming disabled, or being subjected to transient conditions such as network congestion that can negatively impact performance. This maintenance is based on an ability of each node of a cluster of nodes to detect link failure (e.g., from failure of a node or node link) and for the cluster to recover from such failure. To enable this maintenance, which includes any necessary recovery from a link failure, the discovery processes discussed above (e.g., the link neighbor discovery process and the depth chart propagation process) are extended to take advantage of statistics and/or interrupts made available by underlying network functionality.

This link failure detection can be handled in different manners based on the underlying capabilities of the link to report errors For example, with a link that cannot asynchronous warn of a failure, a preferred option is for the link state is checked periodically (e.g., every 5 ms) for a link failure and recover flow is initiated once a link failure is detected. On a link that can asynchronously report errors, an interrupt can typically be received whenever the link state changes. Once the interrupt is received thereby indicating that the link state has gone from good to bad, recovery flow is initiated. Accordingly, in a system without synchronous or asynchronous alerting of failed links, a run-time discovery code can make use of periodic link-directed messages to identify a problem (e.g., messages are not returned for some period of time) with a given link and, alternatively, the periodic messages can be skipped in a system that has synchronous or asynchronous alerting of failed links.

Figure 9:
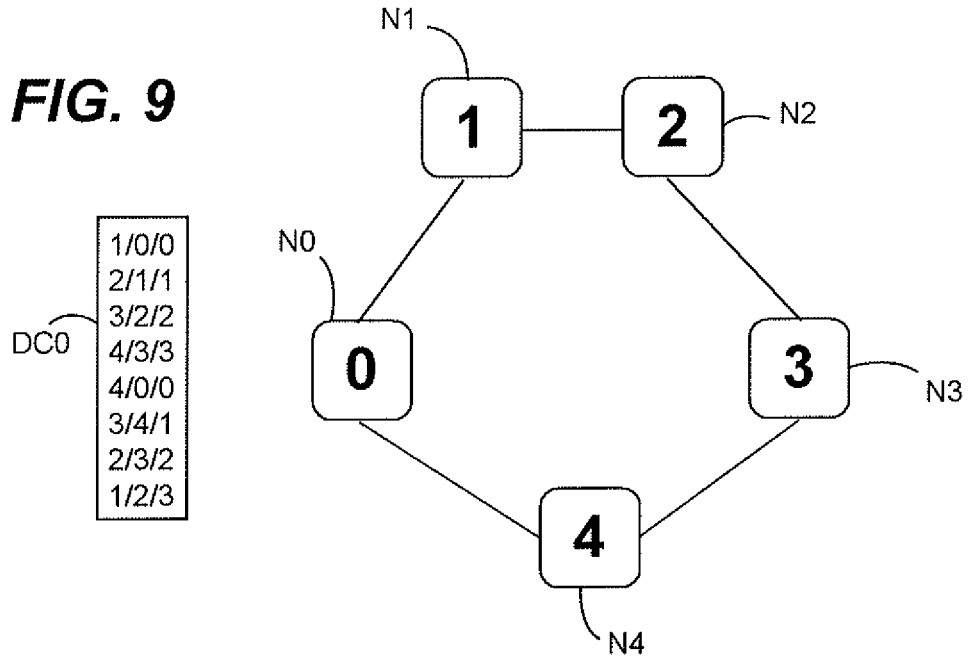
FIGS. 9-12 show aspects of implementing a cluster routing recovery process in accordance with an embodiment of the present invention.
Figure 10:
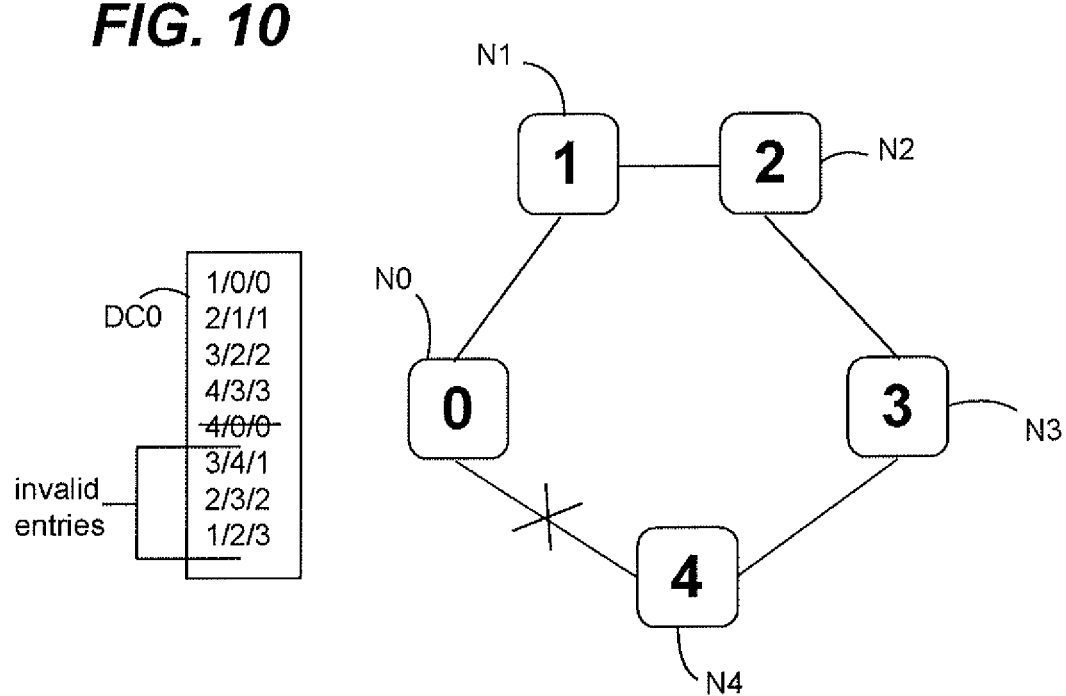
Figure 11:
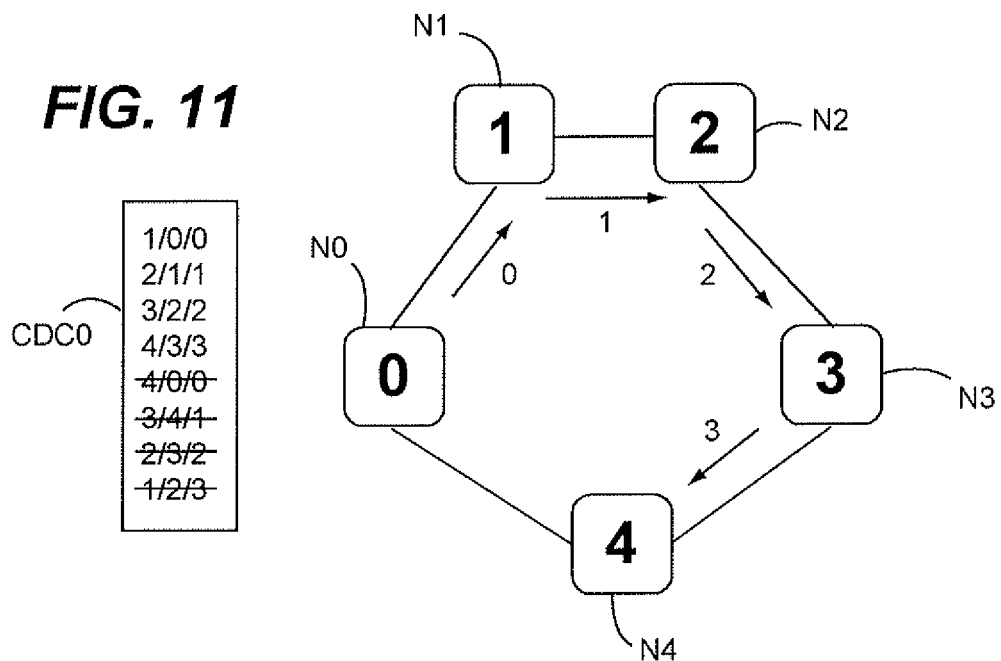
Figure 12:
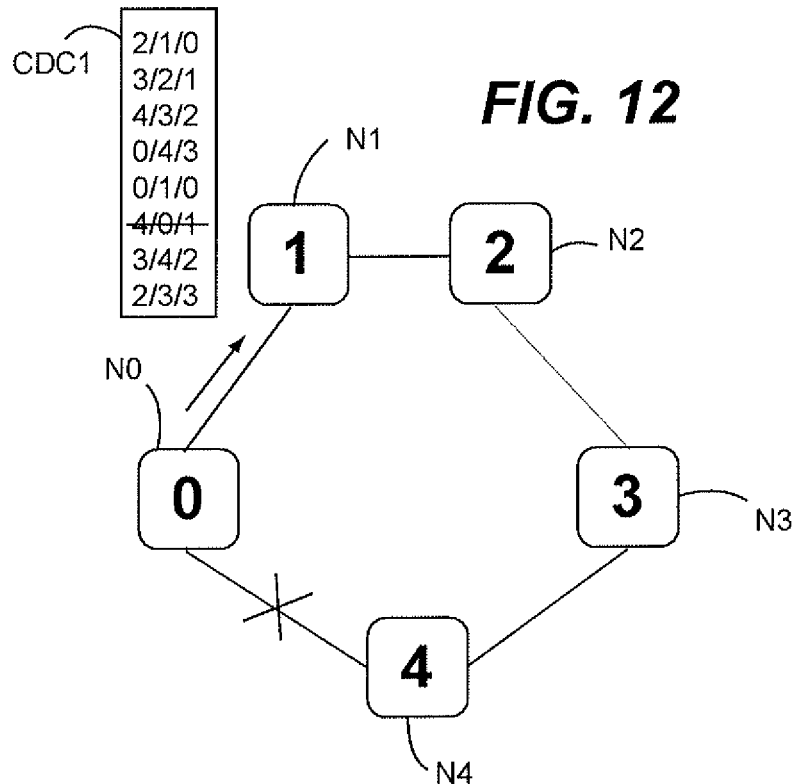

When a problem with a link is detected, a cluster routing recovery process is initiated in which the node updates its depth chart, updates its routing table, and sends a depth chart update to its neighbors such as through a standard depth chart update message discussed above. FIG. 9 shows a 5-node cluster (e.g., a cluster of 5 SoC nodes) and associated depth chart for illustrating the cluster routing recovery process from the perspective of Node 0. As shown in FIG. 10, the bidirectional link between Node 0 and Node 4 fails. Node 0 first learns of the link failure through one of the aforementioned failure detection techniques and initiates the recovery by removing the depth chart entry for the failed link. As a result of the failed link, as shown in FIG. 10, the cluster depth chart for Node 0 (i.e., CDC0) contains invalid depth chart entries and the routing table of Node 0 will therefore be an invalid routing table. In response to the recovery process being initiated, Node 0 initiates a process of updating its full (i.e., cluster) depth chart to reflect the loss of the link. As shown in FIG. 11, this is done by identifying immediately reachable target nodes (0 hop count, direct-connect neighbors) and then incrementing a counter and walking outward through the reachable nodes, updating hop counts along the way as some may increase due to the loss of the link. Each depth chart entry reached in this process is marked as valid. When no more depth chart entries can be reached, all depth chart entries not marked as valid are no longer reachable and can be removed. Thereafter, the routing table entries for all modified nodes in the depth chart are correspondingly updated. Next, a depth chart update message is sent to all neighbors of Node 0. As shown in FIG. 12, Node 0 sends the depth chart update message for the failed 0 to 4 link on to Node 1 where the recovery process repeats, as shown in cluster depth chart CDC1.

if the problem turns out to be with just the node link, then this depth chart change will propagate outward and routes dependent on that node link will be removed from the cluster. If the problem was with the remote node itself (i.e., Node 4), then other neighbors will be propagating similar changes the net result of which will be to remove that node (i.e., Node 4) from the fabric. If the problem is one of congestion instead of outright loss of link, the same mechanisms can be used though the changes are more subtle. In the non-asynchronous alerting system, the periodic messages would be enhanced to include timing data that can be used to identify when a given link is performing sub-optimally. In the asynchronous alerting system, thresholds based on flow control metrics or other statistics can be set for identifying problem links. When a link is found to be underperforming, the rest of the system can be adjusted via the propagation of a depth chart update message showing additional hops than previously discovered. This will have the effect of encouraging nodes to prefer alternative routes to the node than through the problem link. The code responsible for implementing the recovery process will need to continue to monitor the link and re-adjust the system when or if the link returns to normal functioning. Furthermore, when changes occur to the routing, spanning tree generation processes and any routing rules need to be reapplied. One example of a routing rule is enabled by link directional information gained in creating a spanning tree (see below) and entails apply using data gained in the depth chart update phase described above to establish a set of routes free of resource loops without having any more knowledge of the overall topology than what was necessary for basic routing.

Thus, in view of the disclosures made herein in regard to implementing recovery in accordance with one embodiment of the present invention, a skilled person will appreciate that recovery processes can include: 1. removing the depth chart entry for the broken link, 2. recovering the fabric by updating all depth chart entries to account for the newly removed entry, 3. removing all nodes that have become unreachable as a result of the lost depth chart entry, 4. updating the routing table for each node whose depth chart entries have changed, and 5. removing IP addresses and MAC addresses for all unreachable nodes. Furthermore, it is disclosed herein that implementation of recovery functionality for maintaining a fabric over time against nodes or node links being removed, becoming disabled, or being subjected to adverse transient conditions can advantageously be localized only to nodes whose routes have changed.

Turning now to a discussion of implementing spanning tree computation in accordance with an embodiment of the present invention, it is known that a common problem with discovered topologies is having loops within discovered routes. These loops can cause performance and stability issues in a network (e.g., a cluster of SoC nodes). For example, in a fabric of a cluster of nodes that supports broadcast packets (i.e., a requirement for supporting Ethernet in the fabric), a loop can result in a packet being sent from node to node in succession with each node in the loop seeing the packet ad infinitum.

A standard method for detecting and breaking loops within discovered routes of a discovered topology is the calculation of a spanning tree that identifies a minimal set of links connecting all nodes without the presence of a loop (i.e., a collection of links that are mapped out by a single entity (e.g., node of cluster of nodes). The manner in which a spanning tree is derived when knowing an overall topology is well known, as are methods for determining a spanning tree from a control node within a fabric. However, when running in a node environment with limited processing power, memory, and storage (e.g., a management engine of a SoC node), traditional methods for finding a spanning tree have limited effectiveness and/or efficiency (i.e., are a poor fit). As such, implementing spanning tree functionality in accordance with the present invention is unique and advantageous in the context of a cluster of nodes in which spanning tree computations are performed by a management engine of a node. More specifically, spanning tree functionality in accordance with the present invention is implemented with minimal node-to-node communication and with no one entity having to manage or monitor spanning tree status and its associated computations. As such, spanning tree functionality implemented in accordance with the present invention and the disclosed discovery functionalities in general can scale to thousands or tens of thousands of nodes despite such nodes having relatively limited resources for implementing such discovery functionalities.

Embodiments of the present invention provide for a spanning tree that guarantees no loops in routing of a cluster of nodes can be generated using an extension of conventional discovery messages, the knowledge gained from the discovery process, and communication with only immediate neighbors. One example of the extension of conventional discovery messages is the addition of two newly implemented messages (i.e., implemented in accordance with the present invention) that are sent by a node whenever a change occurs in which neighbor is the first hop on the node's route to the top of the spanning tree. One of these newly implemented messages is sent to the node that was previously the first hop telling it that it can remove their shared link from the spanning tree and the other one of these newly implemented messages is sent to the new first hop telling it to add their shared link to the spanning tree.

A cluster depth chart as disclosed and discussed above provides an efficient means for the distributed computation of a spanning tree. One prominent use of a spanning tree in the context of a fabric of a cluster of nodes is to generate a broadcast vector that is a mapping for each node of which links should be used when sending out a broadcast packet. The spanning tree computation process can rely on the fact that each node has a cluster depth chart that provides a route to every other node in the fabric. Thus, each node knows the route to any node chosen as the source node for a spanning tree and the first hop on the shortest path to the source node is added to the spanning tree. Using link-directed messages, for example, each node tells its neighbors whether each link is or is not in the spanning tree. Those neighboring nodes subsequently add links to and remove links from the spanning tree based on these messages.

Figure 13:
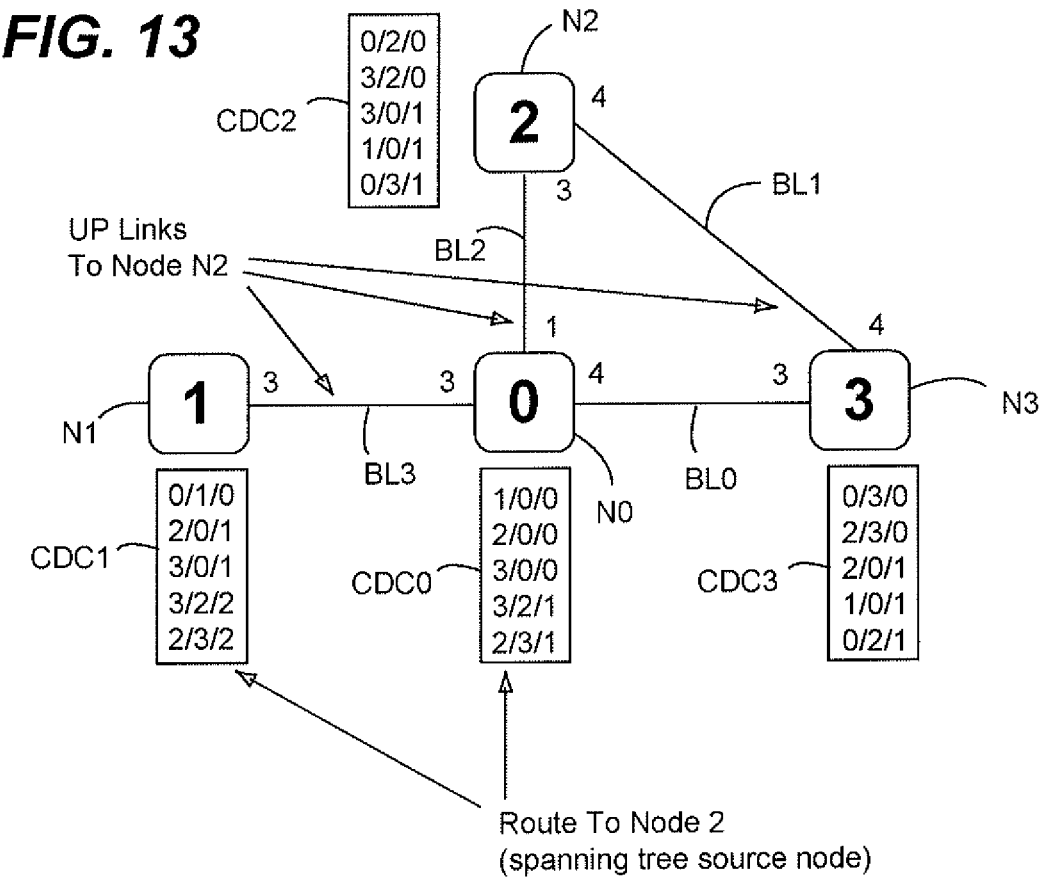
FIGS. 13-16 show aspects of implementing a spanning tree computation process in accordance with an embodiment of the present invention.

FIG. 13 shows a node cluster 200 (i.e., cluster of nodes) including nodes N0-N3 that are connected by bidirectional links BL0-BL3 to form a fabric. As shown, entries of cluster depth charts CDC0-CDC3 for the nodes (e.g., SoC nodes) of the node cluster 200 have a format of target node/neighbor node/hop count (e.g., 0/2/0). As discussed above in reference to discovery, link numbering at a given node (i.e., node link no.) is designated on a per-node basis as shown by the number where each one of the bidirectional link BL0-BL3 terminate at a given one of the Nodes N0-N3. Thus Link 0:1 goes from Node N0 to Node N1. Furthermore, it is important to note that link direction we are discussing is important, so Link 0:1 and Link 1:0 refer to the same physical link, but logically extend in opposite directions.

Figure 14:
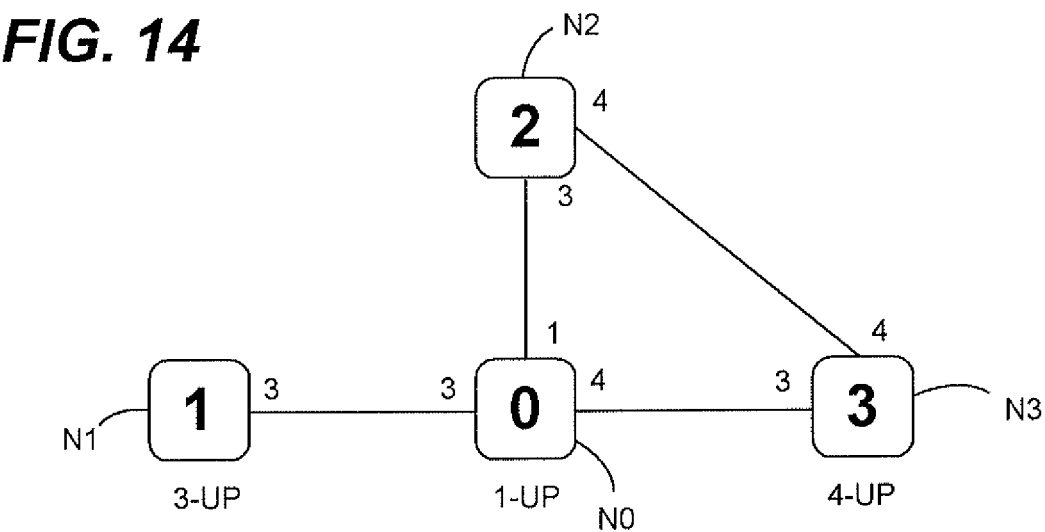
Figure 15:
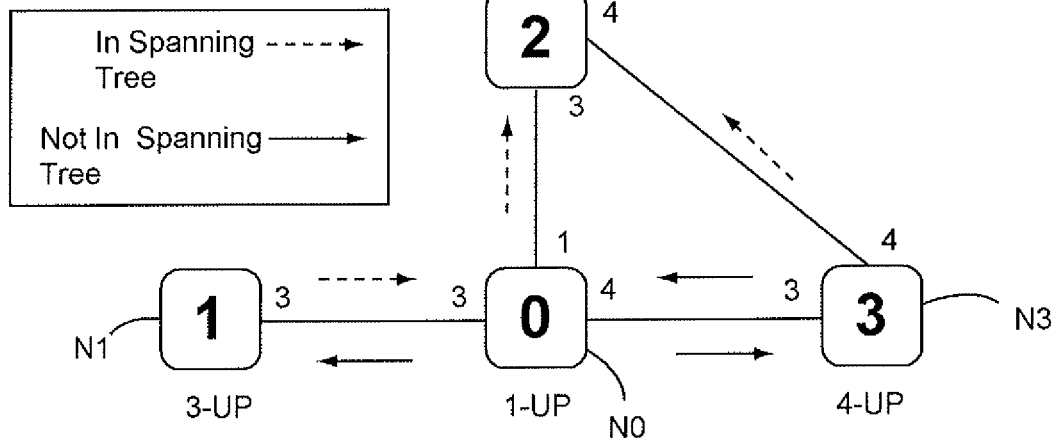
Figure 16:
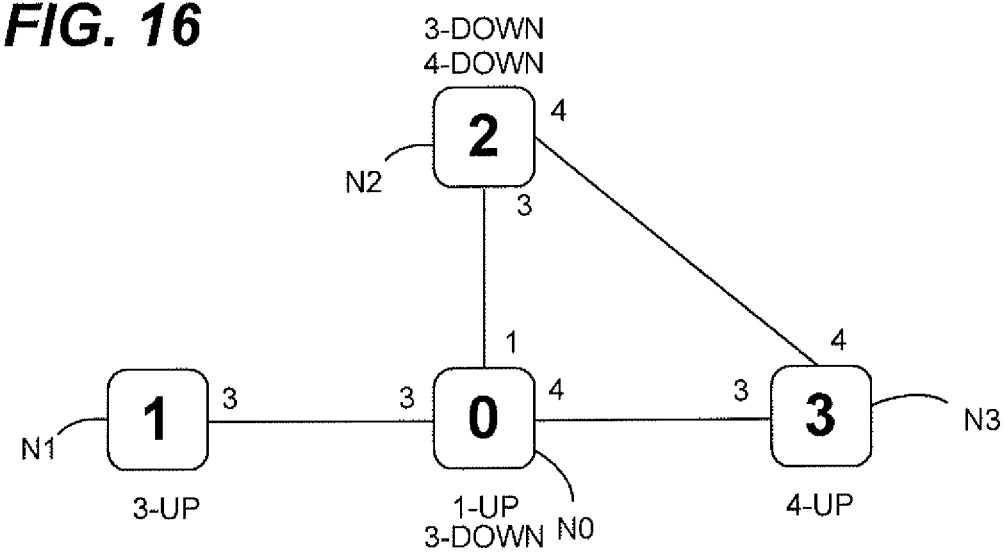

As shown in FIG. 13, a process for computing a spanning tree (i.e., the spanning tree computation process) begins with an operation being performed for tracing the shortest route to the source node (i.e., Node N2) to get the nearest spanning tree link (i.e., the UP Links). An operation is then performed, as shown in FIG. 14, for tracing which links are in the spanning tree and which are UP Links and DOWN Links. Down Link means that the sending node is lower in the spanning tree than the receiving node. In conjunction with tracing which links are in the spanning tree and which are UP links and DOWN links, an operation is performed for sending a message on each link informing neighbors whether links are in the spanning tree or not, as shown in FIG. 15. In response to (e.g., after) sending the messages, as shown in FIG. 16, an operation is performed for adding links to the spanning tree based on the messages (as down links) and removing links receiving negative messages if the link is not an UP link. The spanning tree computation process completes when discovery converges. Whenever a route to the source node changes (e.g., due to new information in the depth chart), an operation is performed for causing the above spanning tree computation operations to be repeated. If a node in the spanning tree fails at a later time, the process repeats to recover the spanning tree.

Any link upon which a node sends or receives a spanning tree message is part of the spanning tree, any other link is a "lateral link" and not part of the tree. Once a node has identified its own links that are part of the spanning tree, it can act on that knowledge in cooperation with other nodes for the health of the fabric. For example, with the knowledge of its own part of the spanning tree, a node can guide broadcast packets to avoid lateral links and thus preventing the packet looping described above.

Embodiments of the present invention are well suited for the handling of discovery for relatively large systems, which could prove to be difficult with standard implementations. More specifically, larger systems (referred to herein as super-clusters) can be accommodated by reusing the same discovery processes disclosed above at a granularity represented by subsets of the a super-cluster. Accordingly, as mentioned above, discovery functionalities implemented in accordance with the present invention can scale to thousands or tens of thousands of nodes (e.g., SoC nodes) despite such nodes having relatively limited resources (e.g., management engine resources) for implementing such discovery functionalities.

Figure 17:
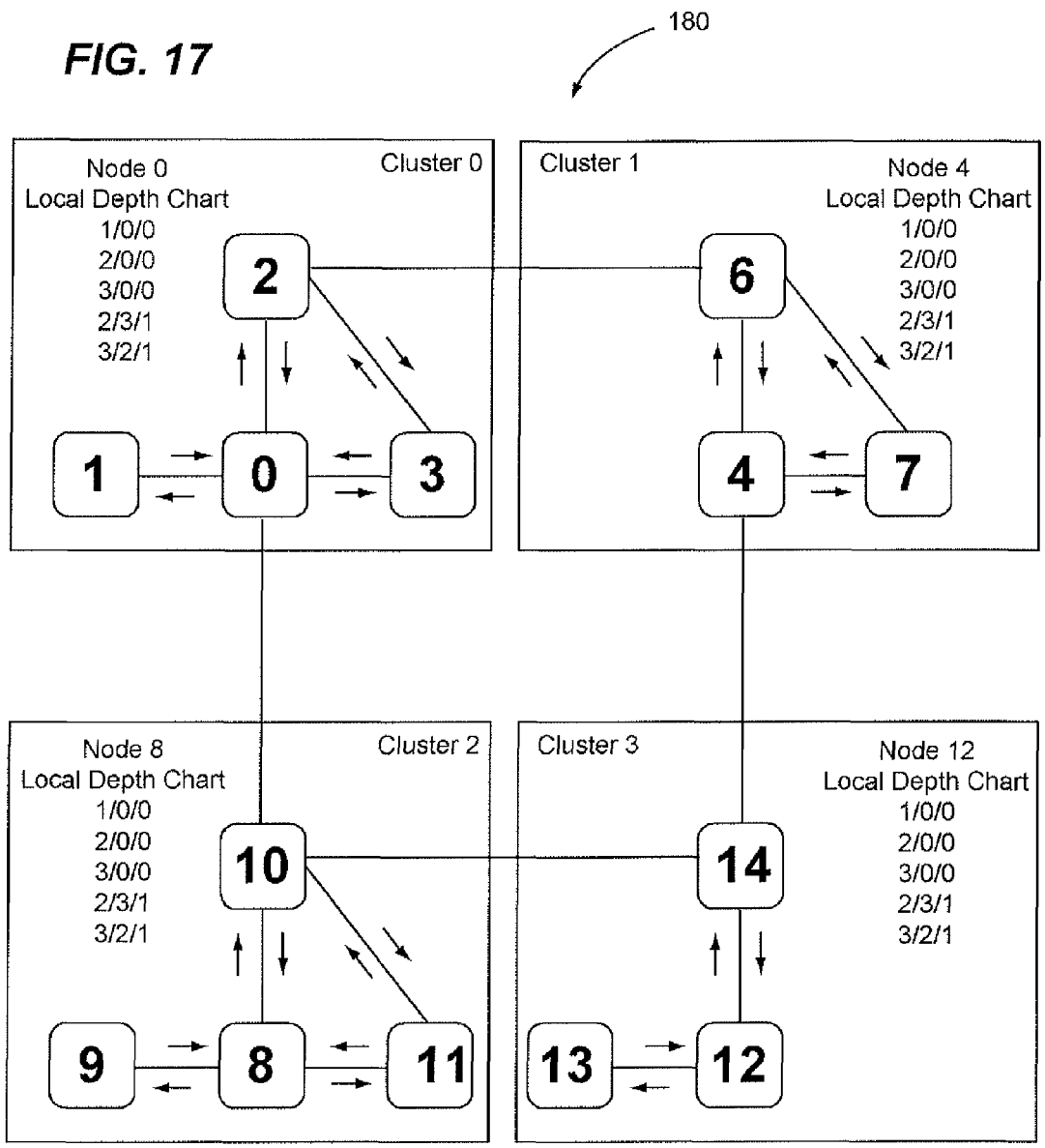
FIGS. 17-19 show aspects of implementing a super-cluster discovery process in accordance with an embodiment of the present invention.
Figure 18:
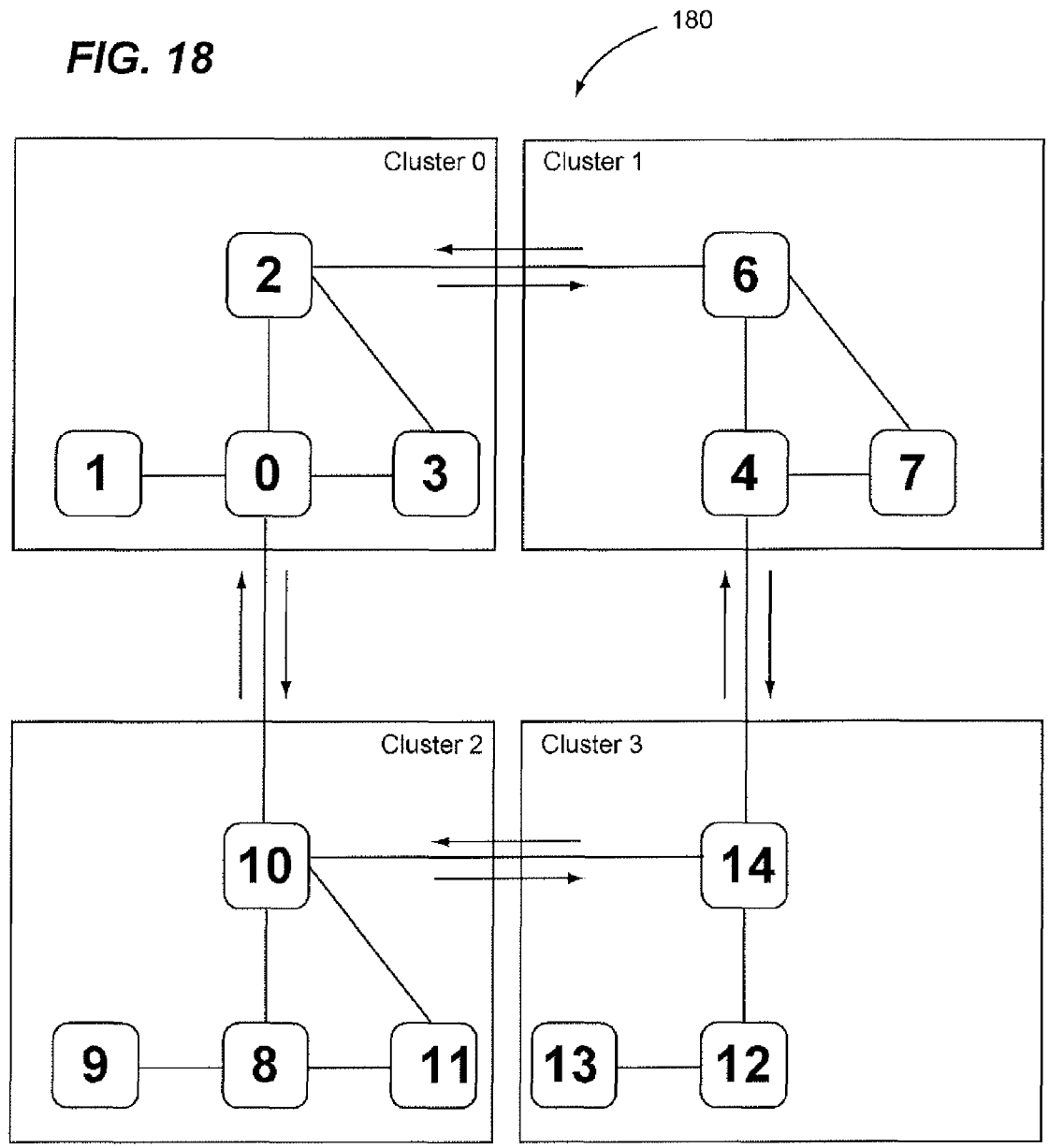
Figure 19:
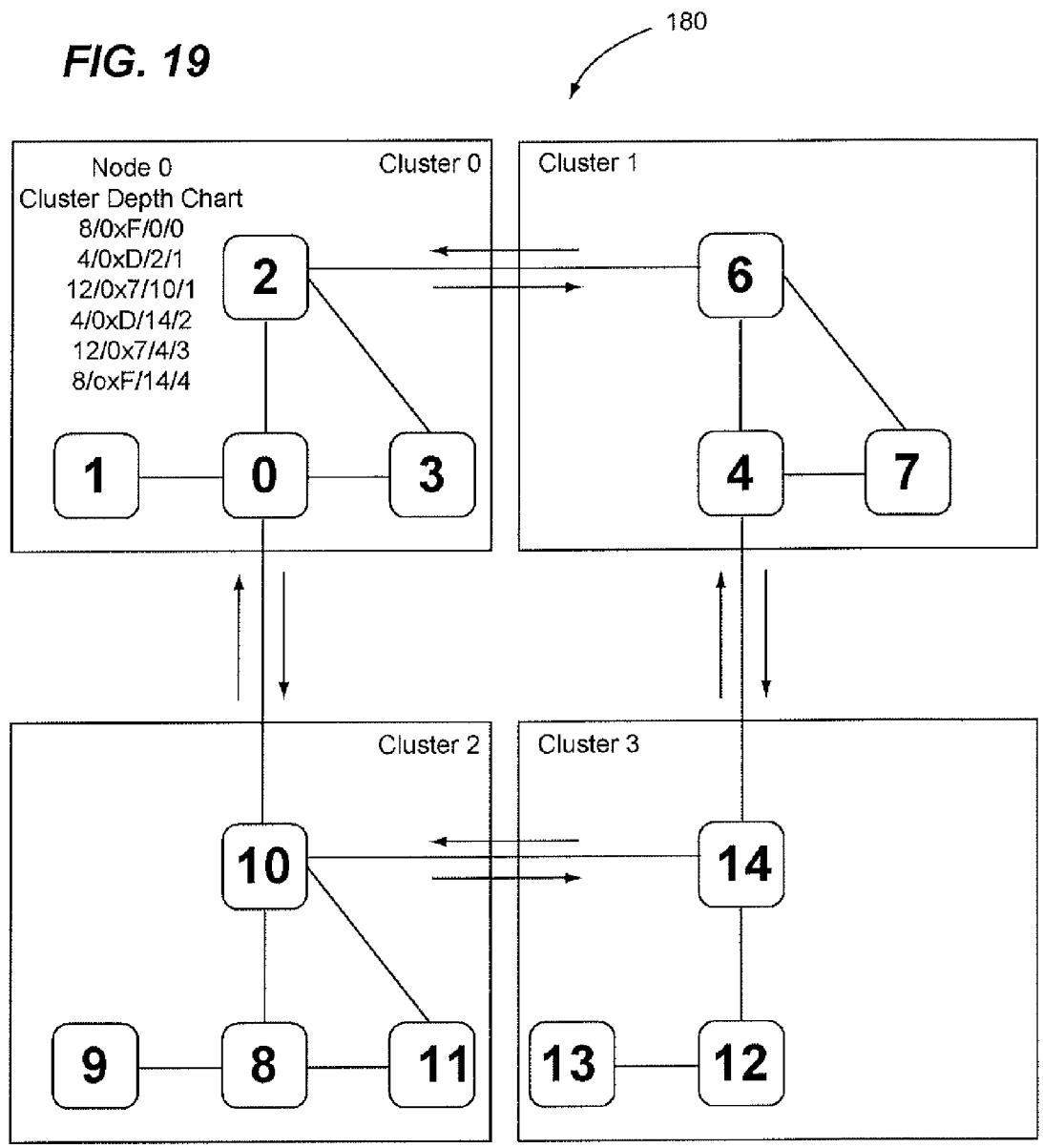

FIG. 17 shows a super-cluster 180 including a set of interconnected 4-node clusters C0 -C3. The arrows in clusters C0-C3 of FIG. 17 represent local depth chart updates. Discovery for super-cluster 300 begins at a local cluster level (i.e., clusters C0-C3 are each a local cluster) where each node in a particular local cluster learns the routes to the other nodes in that particular local cluster (e.g., as shown for local nodes N0, N4, N8, and N12). In a preferred embodiment, discovery at the local cluster level (i.e., local discovery) is performed in the same or a similar manner as disclosed above in reference to FIGS. 2-8, thereby producing a local depth chart for each cluster. As shown in FIG. 17, entries of local depth charts for Node 0 , node 4, Node 8, and Node 12 are in the format of target node/neighbor node/hop count (e.g., 1/0/0). After local discovery completes, discovery between clusters (i.e., inter-cluster discovery) is initiated, as shown in FIG. 18. The arrows between clusters C0-C3 of FIG. 17 represent cluster depth chart updates. In inter-cluster discovery, an inter-cluster depth chart update comprises a node number offset and bit mask of the nodes in the cluster (e.g., based on the node number offset). In this regard, messaging required for inter-cluster depth chart update (i.e., inter-cluster depth chart update messages) has a compressed message format that consumes a limited (e.g., minimum) amount of computing resources while providing the information needed to route across the clusters. A receiving node of a particular local cluster generates an entry in its cluster depth chart that includes (e.g., consisting of) node offset, bit mask, neighbor node, and hop count. This cluster depth chart information is subsequently distributed to the other nodes in the particular local cluster. FIG. 19 shows the super-cluster 300 once inter-cluster discovery has completed. For each node (e.g., as shown for local node N0), there is now a local depth chart (shown in FIG. 17) and an associated cluster depth chart (shown in FIG. 19). These two depth charts jointly provide a sufficient map of the super-cluster to route a message from any one node of the super-cluster to any other node of the super-cluster. As shown in FIG. 19, entries of cluster depth charts are in the format of offset/bit mask/neighbor node/hop count (e.g., 8/0xF/0/0)

In view of the disclosures made herein, a skilled person will appreciate that a system on a chip (SoC) refers to integration of one or more processors, one or more memory controllers, and one or more I/O controllers onto a single silicon chip. Furthermore, in view of the disclosures made herein, the skilled person will also appreciate that a SoC configured in accordance with the present invention can be specifically implemented in a manner to provide functionalities definitive of a server. In such implementations, a SoC in accordance with the present invention can be referred to as a server on a chip. In view of the disclosures made herein, the skilled person will appreciate that a server on a chip configured in accordance with the present invention can include a server memory subsystem, a server I/O controllers, and a server node interconnect. In one specific embodiment, this server on a chip will include a multi-core CPU, one or more memory controllers that support ECC, and one or more volume server I/O controllers that minimally include Ethernet and SATA controllers. The server on a chip can be structured as a plurality of interconnected subsystems, including a CPU subsystem, a peripherals subsystem, a system interconnect subsystem, and a management subsystem.

An exemplary embodiment of a server on a chip (i.e. a SoC unit) that is configured in accordance with the present invention is the ECX-1000 Series server on a chip offered by Calxeda incorporated. The ECX-1000 Series server on a chip includes a SoC architecture that provides reduced power consumption and reduced space requirements. The ECX-1000 Series server on a chip is well suited for computing environments such as, for example, scalable analytics, webserving, media streaming, infrastructure, cloud computing and cloud storage. A node card configured in accordance with the present invention can include a node card substrate having a plurality of the ECX-1000 Series server on a chip instances (i.e., each a server on a chip unit) mounted on the node card substrate and connected to electrical circuitry of the node card substrate. An electrical connector of the node card enables communication of signals between the node card and one or more other instances of the node card.

The ECX-1000 Series server on a chip includes a CPU subsystem (i.e., a processor complex) that uses a plurality of ARM brand processing cores (e.g., four ARM Cortex brand processing cores), which offer the ability to seamlessly turn on-and-off up to several times per second. The CPU subsystem is implemented with server-class workloads in mind and comes with a ECC L2 cache to enhance performance and reduce energy consumption by reducing cache misses. Complementing the ARM brand processing cores is a host of high-performance server-class I/O controllers via standard interfaces such as SATA and PCI Express interfaces. Table 3 below shows technical specification for a specific example of the ECX-1000 Series server on a chip.

TABLE 3

Example of ECX-1000 Series server on a chip technical specification

| | |
|---|---|
| Processor Cores | 1. Up to four ARM ® Cortex ™-A9 cores @ 1.1 to 1.4 GHz<br>2. NEON ® technology extensions for multimedia and SIMD processing<br>3. Integrated FPU for floating point acceleration<br>4. Calxeda brand TrustZone ® technology for enhanced security<br>5. Individual power domains per core to minimize overall power consumption |
| Cache | 1. 32 KB L1 instruction cache per core<br>2. 32 KB L1 data cache per core<br>3. 4 MB shared L2 cache with ECC |
| Fabric Switch | 1. Integrated 80 Gb (8 × 8) crossbar switch with through-traffic support<br>2. Five (5) 10 Gb external channels, three (3) 10 Gb internal channels<br>3. Configurable topology capable of connecting up to 4096 nodes<br>4. Dynamic Link Speed Control from 1 Gb to 10 Gb to minimize power and maximize performance<br>5. Network Proxy Support to maintain network presence even with node powered off |
| Management Engine | 1. Separate embedded processor dedicated for systems management<br>2. Advanced power management with dynamic power capping<br>3. Dedicated Ethernet MAC for out-of-band communication<br>4. Supports IPMI 2.0 and DCMI management protocols<br>5. Remote console support via Serial-over-LAN (SoL) |

TABLE 3-continued

Example of ECX-1000 Series server on a chip technical specification

| | |
|---|---|
| Integrated Memory Controller | 1. 72-bit DDR controller with ECC support<br>2. 32-bit physical memory addressing<br>3. Supports DDR3 (1.5 V) and DDR3L (1.35 V) at 800/1066/1333 MT/s<br>4. Single and dual rank support with mirroring |
| PCI Express | 1. Four (4) integrated Gen2 PCIe controllers<br>2. One (1) integrated Gen1 PCIe controller<br>3. Support for up to two (2) PCIe x8 lanes<br>4. Support for up to four (4) PCIe x1, x2, or x4 lanes |
| Networking Interfaces | 1. Support 1 Gb and 10 Gb Ethernet<br>2. Up to five (5) XAUI 10 Gb ports<br>3. Up to six (6) 1 Gb SGMII ports (multiplexed w/XAUI ports)<br>4. Three (3) 10 Gb Ethernet MACs supporting IEEE 802.1Q VLANs, IPv4/6 checksum processing, and TCP/UDP/ICMP checksum offload<br>5. Support for shared or private management LAN |
| SATA Controllers | 1. Support for up to five (5) SATA disks<br>2. Compliant with Serial ATA 2.0, AHCI Revision 1.3, and eSATA specifications<br>3. SATA 1.5 Gb/s and 3.0 Gb/s speeds supported |
| SD/eMMC Controller | 1. Compliant with SD 3.0 Host and MMC 4.4 (eMMC) specifications<br>2. Supports 1 and 4-bit SD modes and 1/4/8-bit MMC modes<br>3. Read/write rates up to 832 Mbps for MMC and up to 416 Mbps for SD |
| System Integration Features | 1. Three (3) I2C interfaces<br>2. Two (2) SPI (master) interface<br>3. Two (2) high-speed UART interfaces<br>4. 64 GPIO/Interrupt pins<br>5. JTAG debug port |

Figure 20:
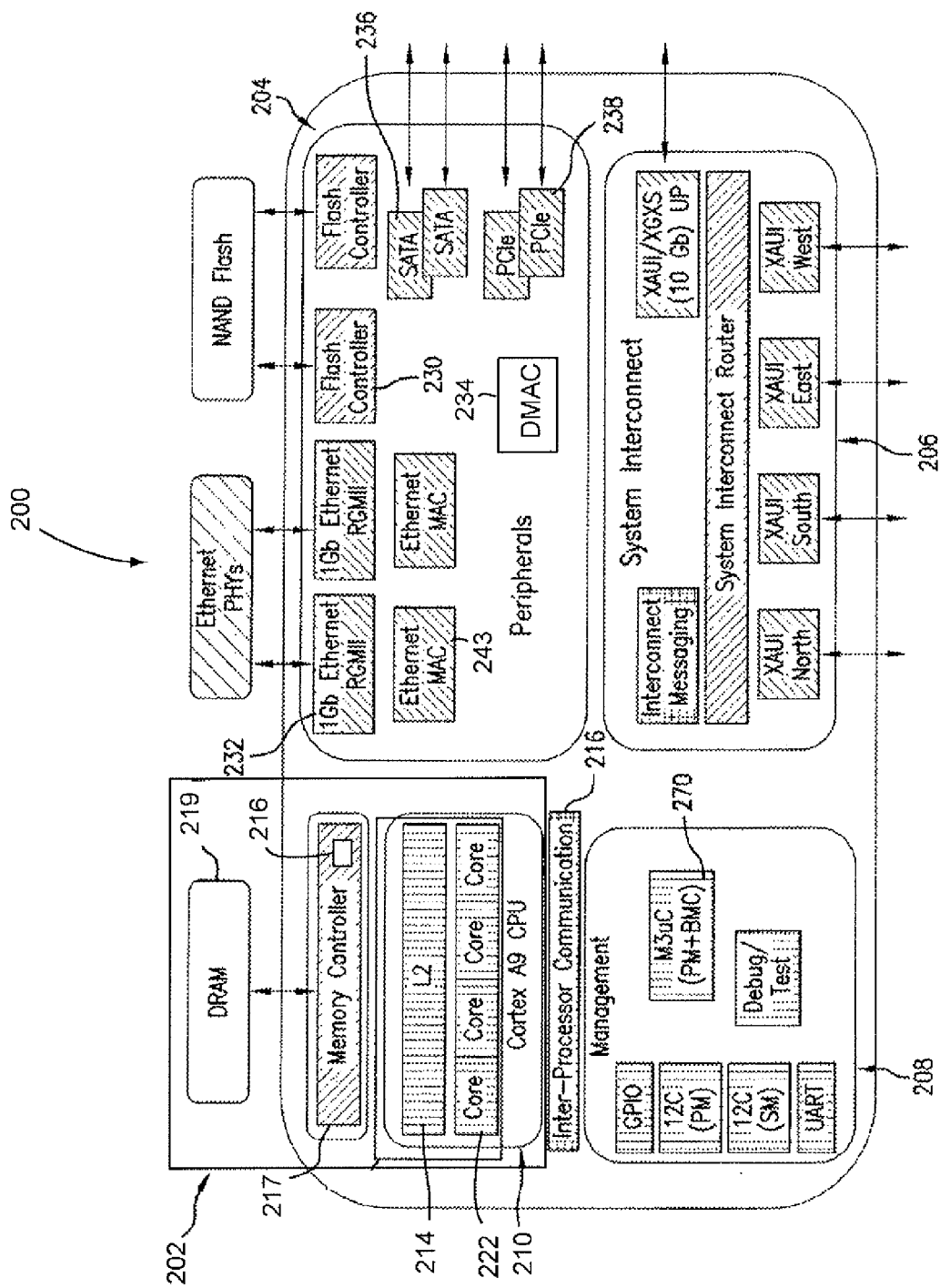
FIG. 20 illustrates a logical view of a system on a chip (SoC).

FIG. 20 shows a SoC unit (i.e., SoC 200) configured in accordance with an embodiment of the present invention. More specifically, the SoC 200 is configured for implementing discovery functionalities as disclosed herein. The SoC 200 can be utilized in standalone manner. Alternatively, the SoC 200 can be utilized in combination with a plurality of other SoCs on a node card such as, for example, with each one of the SoCs being associated with a respective node of the node card.

The SoC 200 includes a node CPU subsystem 202, a peripheral subsystem 204, a system interconnect subsystem 206, and a management subsystem 208. In this regard, a SoC configured in accordance with the present invention can be logically divided into several subsystems. Each one of the subsystems includes a plurality of operation components therein that enable a particular one of the subsystems to provide functionality thereof. Furthermore, each one of these subsystems is preferably managed as independent power domains.

The node CPU subsystem 202 of SoC 200 provides the core CPU functionality for the SoC, and runs the primary user operating system (e.g. Ubuntu Linux). As shown in FIG. 20, the Node CPU subsystem 202 comprises a node CPU 210, a L2 cache 214, a L2 cache controller 216, memory controller 217, and main memory 219. The node CPU 210 includes 4 processing cores 222 that share the L2 cache 214. Preferably, the processing cores 222 are each an ARM Cortex A9 brand processing core with an associated media processing engine (e.g., Neon brand processing engine) and each one of the processing cores 222 can have independent L1 instruction cache and L1 data cache. Alternatively, each one of the processing cores can be a different brand of core that functions in a similar or substantially the same manner as ARM Cortex A9 brand processing core. Each one of the processing cores 222 and its respective L1 cache is in a separate power domain.

Optionally, the media processing engine of each processing core 222 can be in a separate power domain. Preferably, all of the processing cores 222 within the node CPU subsystem 202 run at the same speed or are stopped (e.g., idled, dormant or powered down).

The memory controller 217 is coupled to the L2 cache 214 and to a peripheral switch of the peripheral subsystem 204. Preferably, the memory controller 217 is configured to control a plurality of different types of main memory (e.g., DDR3, DDR3L, LPDDR2). An internal interface of the memory controller 217 can include a core data port, a peripherals data port, a data port of a power management unit (PMU) portion of the management subsystem 208, and an asynchronous 32-bit AHB slave port. The PMU data port is desirable to ensure isolation for some low power states. The asynchronous 32-bit AHB slave port is used to configure the memory controller 217 and access its registers. The asynchronous 32-bit AHB slave port is attached to the PMU fabric and can be synchronous to the PMU fabric in a similar manner as the asynchronous interface is at this end. In one implementation, the memory controller 217 is an AXI interface (i.e., an Advanced eXtensible Interface).

The peripheral subsystem 204 of SoC 200 has the primary responsibility of providing interfaces that enable information storage and transfer functionality. This information storage and transfer functionality includes information storage and transfer both within a given SoC Node and with SoC Nodes accessibly by the given SoC Node. Examples of the information storage and transfer functionality include, but are not limited to, flash interface functionality, PCIe interface functionality, SATA interface functionality, and Ethernet interface functionality. The peripheral subsystem 204 can also provide additional information storage and transfer functionality such as, for example, direct memory access (DMA) functionality. Each of these peripheral subsystem functionalities is provided by one or more respective controllers that interface to one or more corresponding storage media (i.e., storage media controllers).

The peripherals subsystem 204 includes the peripheral switch and a plurality of peripheral controllers for providing the abovementioned information storage and transfer functionality. The peripheral switch can be implemented in the form of a High-Performance Matrix (HPM) that is a configurable auto-generated advanced microprocessor bus architecture 3 (i.e., AMBA protocol 3) bus subsystem based around a high-performance AXI cross-bar switch known as the AXI bus matrix, and extended by AMBA infrastructure components.

The peripherals subsystem 204 includes flash controllers 230 (i.e. a first type of peripheral controller). The flash controllers 230 can provide support for any number of different flash memory configurations. A NAND flash controller such as that offered under the brand name Denali is an example of a suitable flash controller. Examples of flash media include MultiMediaCard (MMC) media, embedded MultiMediaCard (eMMC) media, Secure Digital (SD) media, SLC/MLC+ ECC media, and the like. Memory is an example of media (i.e., storage media) and error correcting code (ECC) memory is an example of a type of memory to which the main memory 217 interfaces (e.g., main memory 219).

The peripherals subsystem 204 includes Ethernet MAC controllers 232 (i.e. a second type of peripheral controller). Each Ethernet MAC controller 232 can be of the universal 1 Gig design configuration or the 10G design configuration. The universal 1 Gig design configuration offers a preferred interface description. The Ethernet MAC controllers 232 includes a control register set and a DMA (i.e., an AXI master and an AXI slave). Additionally, the peripherals subsystem 204 can include an AXI2 Ethernet controller 233. The peripherals subsystem 204 includes a DMA controller 234 (i.e., (i.e. a third type of peripheral controller). DMA functionality is useful only for fairly large transfers. Thus, because private memory of the management subsystem 208 is relatively small, the assumption is that associated messages will be relatively small and can be handled by an interrupt process. If the management subsystem 208 needs/wants large data transfer, it can power up the whole system except the cores and then DMA is available. The peripherals subsystem 204 includes a SATA controller 236 (i.e. a fourth type of peripheral controller). The peripherals subsystem 204 also includes PCIe controllers 238. As will be discussed below in greater detail, a XAUI controller of the peripherals subsystem 204 is provided for enabling interfacing with other CPU nodes (e.g., of a common node card).

The system interconnect subsystem 206 is a packet switch that provides intra-node and inter-node packet connectivity to Ethernet and within a cluster of nodes (e.g., small clusters up through integration with heterogeneous large enterprise data centers). The system interconnect subsystem 206 provides a high-speed interconnect fabric, providing a dramatic increase in bandwidth and reduction in latency compared to traditional servers connected via 1 Gb Ethernet to a top of rack switch. Furthermore, the system interconnect subsystem 206 is configured to provide adaptive link width and speed to optimize power based upon utilization.

An underlying objective of the system interconnect subsystem 206 is support a scalable, power-optimized cluster fabric of server nodes. As such, the system interconnect subsystem 206 has three primary functionalities. The first one of these functionalities is serving as a high-speed fabric upon which TCP/IP networking is built and upon which the operating system of the node CPU subsystem 202 can provide transparent network access to associated network nodes and storage access to associated storage nodes. The second one of these functionalities is serving as a low-level messaging transport between associated nodes. The third one of these functionalities is serving as a transport for remote DMA between associated nodes.

The system interconnect subsystem 206 can be connected to the node CPU subsystem 202 and the management subsystem 208 through a bus fabric (i.e., Ethernet AXIS) of the system interconnect subsystem 206. An Ethernet interface of the system interconnect subsystem 206 can be connected to peripheral interfaces (e.g., interfaces 230, 232, 234, 238) of the peripheral subsystem 204. A fabric switch (i.e., a switch-mux) can be coupled between the XAUI link ports of the system interconnect subsystem 206 and one or more MAC's 243 of the system interconnect subsystem 206. The XAUI link ports and MACs (i.e., high-speed interconnect interfaces) enabling the node that comprises the SoC 200 to be connected to associated nodes each having their own SoC (e.g., identically configured SoCs).

The processor cores 222 (i.e., A9 cores) of the node CPU subsystem 202 and management processor 270 (i.e., M3) of the management subsystem 208 can address MACs (e.g., MAC 243) of the system interconnect subsystem 206. In certain embodiments, the processor cores 222 of the node CPU subsystem 202 will utilize a first MAC and second MAC and the management processor 270 of the management subsystem 208 will utilize a third MAC. To this end, MACs of the system interconnect subsystem 206 can be configured specifically for their respective application.

The management subsystem 208 is coupled directly to the node CPU subsystem 202 and directly to the to the system interconnect subsystem 206. An inter-processor communication (IPC) module (i.e., IPCM) of the management subsystem 208, which includes IPC 216, is coupled to the node CPU subsystem 202, thereby directly coupling the management subsystem 208 to the node CPU subsystem 202. The management processor 270 of the management subsystem 208 is preferably, but not necessarily, an ARM. Cortex brand M3 microprocessor. The management processor 270 can have private ROM and private SRAM. The management processor 270 can be coupled to shared peripherals and private peripherals of the management subsystem 208. The private peripherals are only accessible by the management processor, whereas the shared peripherals are accessible by the management processor 270 and each of the processing cores 222. Instructions for implementing embodiments of the present invention (e.g., functionalities, processes and/or operations associated with discovery, recovery, spanning tree computation, and the like) can reside in non-transitory memory coupled to/allocated to the management processor 270.

Additional capabilities arise because the management processor 270 has visibility into all buses, peripherals, and controllers. It can directly access registers for statistics on all buses, memory controllers, network traffic, fabric links, and errors on all devices without disturbing or even the knowledge of the access by the core processing cores 222. This allows for billing use cases where statistics can be gathered securely by the management processor without having to consume core processing resources (e.g., the processing cores 222) to gather, and in a manner that cannot be altered by the core processor 222.

The management processor 270 has a plurality of responsibilities within its respective node. One responsibility of the management processor 270 is booting an operating system of the node CPU 210. Another responsibility of the management processor 270 is node power management. Accordingly, the management subsystem 208 can also be considered to comprise a power management Unit (PMU) for the node and thus, is sometime referred to as such. As discussed below in greater detail, the management subsystem 208 controls power states to various power domains of the SoC 200 (e.g., to the processing cores 222 by regulating clocks). The management subsystem 208 is an "always-on" power domain. However, the management processor 270 can turn off the clocks to the management processor 270 and/or its private and/or shared peripherals to reduce the dynamic power. Another responsibility of the management processor 270 is varying synchronized clocks of the node CPU subsystem 202 (e.g., of the node CPU 210 and a snoop control unit (SCU)). Another responsibility of the management processor 270 is providing baseboard management control (BMC) and IPMI functionalities including console virtualization. Another responsibility of the management processor 270 is providing router management. Another responsibility of the management processor 270 is acting as proxy for the processing cores 222 for interrupts and/or for network traffic. For example, a generalized interrupt controller (GIC) of the node CPU subsystem 202 will cause interrupts intended to be received by a particular one of the processing core 222 to be reflected to the management processor 270 for allowing the management processor 270 to wake the particular one of the processing cores 222 when an interrupt needs to be processed by the particular one of the of the processing cores that is sleeping, as will be discussed below in greater detail. Another responsibility of the management processor 270 is controlling phased lock loops (PLLs). A frequency is set in the PLL and it is monitored for lock. Once lock is achieved the output is enabled to the clock control unit (CCU). The CCU is then signaled to enable the function. The management processor 270 is also responsible for selecting the dividers but the actual change over will happen in a single cycle in hardware. Another responsibility of the management processor 270 is controlling a configuration of a variable internal supply used to supply electrical power to the node CPU subsystem 202. For example, a plurality of discrete power supplies (e.g., some being of different power supplying specification than others (e.g., some having different power capacity levels)) can be selectively activated and deactivated as necessary for meeting power requirements of the node CPU subsystem 202 (e.g., based on power demands of the processing cores 222, the SCU, and/or the controller of the L2 cache 214). A separate power control mechanism (e.g., switch) can be used to control power supply to each of the processing cores 222 and separately to the SCU. Another responsibility of the management processor 270 is managing a real-time-clock (RTC) that exists on a shared peripheral bus of the management subsystem 208. Another responsibility of the management processor 270 is managing a watchdog timer on a private peripheral bus of the management subsystem 208 to aid in recovery from catastrophic software failures. Still another responsibility of the management processor 270 is managing an off-board EEPROM. The off-board EEPROM is device is used to store all or a portion of boot and node configuration information as well as all or a portion of IPMI statistics that require non-volatile storage. Each of these responsibilities of the management processor 270 is an operational functionality managed by the management processor 270. Accordingly, operational management functionality of each one of the subsystem refers to two or more of these responsibilities being managed by the management processor 270.

Figure 21:
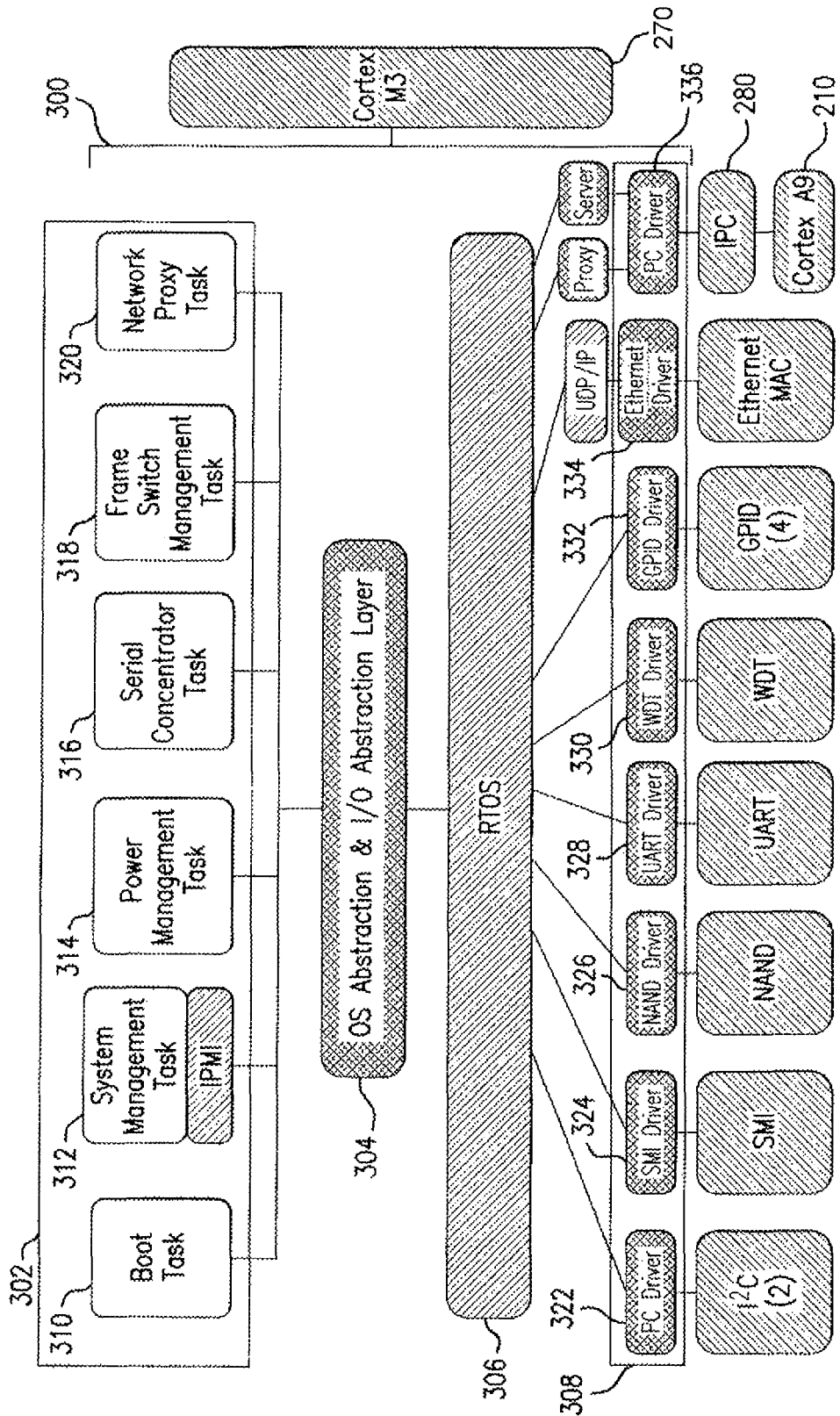
FIG. 21 illustrates a software view of a power management unit.

As shown in FIG. 21, software 300 is provided on the management processor 270. The management processor 270 includes a plurality of application tasks 302, an operating system (OS)/input-output (I/O) abstraction layer 304, a real-time operating system (RTOS) 306, and device drivers 308 for the various devices. The operating system (OS)/input-output (I/O) abstraction layer 304 is a software layer that resides between the application tasks 302 and the real-time operating system (RTOS) 306. The operating system (OS)/input-output (I/O) abstraction layer 304 aids in porting acquired software into this environment. The OS abstraction portion of the operating system (OS)/input-output (I/O) abstraction layer 304 provides posix-like message queues, semaphores and mutexes. The device abstraction portion of the operating system (OS)/input-output (I/O) abstraction layer 304 provides a device-transparent open/close/read/write interface much like the posix equivalent for those devices used by ported software. The real-time operating system (RTOS) 306 resides between the operating system (OS)/input-output (I/O) abstraction layer 304 and the device drivers 308.

The application tasks 302 include, but are not limited to, a boot task 310, a system management task 312, a power management task 314, a serial concentrator task 316, a frame switch management task 318 (sometimes called routing management), and a network proxy task 320. The boot task 310 provides the function of booting the processing cores 222 and the management processor 270. The system management task 312 provides the function of integrated operation of the various subsystems of the SOC 200. The power management task 314 provides the function of managing power utilization of the various subsystems of the SOC 200. The serial concentrator task 316 provides the function of managing communication from the other application tasks to a system console. This console may be directly connected to the SOC node via a UART (i.e., a universal asynchronous receiver/transmitter) or it can be connected to another node in the system. The frame switch management task 318 (sometimes called routing management) is responsible for configuring and managing routing network functionality. As discussed in greater detail below, the network proxy task 320 maintains network presence of one or more of the processing cores 222 while in a low-power sleep/hibernation state and to intelligently wake one or more of the processing cores 222 when further processing is required.

Device drivers 308 are provided for all of the devices that are controlled by the management processor 270. Examples of the device drivers 308 include, but are not limited to, an I2C driver 322, a SMI driver 324, a flash driver 326 (e.g., NAND type storage media), a UART driver 328, a watchdog time (i.e., WDT) driver 330, a general purpose input-output (i.e., GPIO) driver 332, an Ethernet driver 334, and an IPC driver 336. In many cases, these drivers are implemented as simple function calls. In some cases where needed for software portability, however, a device-transparent open/close/read/write type I/O abstraction is provided on top of these functions.

In regard to boot processes, it is well known that multiple-stage boot loaders are often used, during which several programs of increasing complexity sequentially load one after the other in a process of chain loading. Advantageously, however, the node CPU 210 only runs one boot loader before loading the operating system. The ability for the node CPU 210 to only run one boot loader before loading the operating system is accomplished via the management processor 270 preloading a boot loader image into main memory (e.g., DRAM) of the node CPU subsystem before releasing the node CPU 210 from a reset state. More specifically, the SOC 200 can be configured to use a unique boot process, which includes the management processor 270 loading a suitable OS boot loader (e.g., U-Boot) into main memory, starting the node CPU 210 main OS boot loader (e.g., UEFI or U-Boot), and then loading the OS. This eliminates the need for a boot ROM for the node CPU, a first stage boot loader for the node CPU, and dedicated SRAM for boot of the node CPU.

While the foregoing has been with reference to a particular embodiment of the invention, it will be appreciated by those skilled in the art that changes in this embodiment may be made without departing from the principles and spirit of the disclosure, the scope of which is defined by the appended claims.

What is claimed is:

1. A data processing system, comprising:
a plurality of interconnected system on a chip (SoC) units, wherein each SoC unit includes:
one or more processing cores;
one or more peripheral element interfaces coupled to the one or more processing cores;
one or more external ports configured to allow communication of information between the one or more processing cores and other ones of the SoC units;
a switching fabric coupled between the one or more processing cores; and
a management engine coupled to the switching fabric and to each one of the one or more processing cores, wherein the management engine includes one or more management processors, a memory accessible by the one or more management processors, and instructions stored on the memory, wherein, upon execution, the instructions are configured to cause the one or more management processors to generate depth chart entries for a depth chart, wherein the depth chart entries are configured to enable routing of information to each of the SoC units, and wherein the depth chart is an array that is indexed by destination node;
wherein the management engine is configured to generate a spanning tree representation of the plurality of interconnected SoC units based on information derived from the depth chart.

2. The data processing system of claim 1, further comprising instructions configured to cause the one or more management processors to:
determine routing information for neighbor nodes within a cluster of the SoC units; and
use the routing information to generate the depth chart containing routing information for each of the SoC units.

3. The data processing system of claim 2, further comprising instructions configured to cause the one or more management processors to:
propagate the routing information received from one neighbor node to one or more additional neighbor nodes.

4. The data processing system of claim 3, further comprising instructions configured to cause the one or more management processors to not transmit the routing information on a node link from which the routing information was received.

5. The data processing system of claim 1, further comprising instructions configured to cause the one or more management processors to:
generate neighbor depth chart entries for neighbor nodes; and
generate the depth chart using the neighbor depth chart entries for neighbor nodes.

6. The data processing system of claim 5, further comprising instructions configured to cause the one or more management processors to:
remove routing information entries from the depth chart that have become invalid in response to failure of a node link; and
update the depth chart of each neighbor node to reflect invalid entries that have become invalid in response to failure of the node link.

7. The data processing system of claim 1, further comprising instructions configured to cause the one or more management processors to create the depth chart thereof using the depth chart entries, wherein the depth chart is an aggregation of the depth chart entries thereof and depth chart entries received from neighbor nodes.

8. The data processing system of claim 7, further comprising instructions configured to cause the one or more management processors to:
remove routing information entries from the depth chart that have become invalid in response to failure of a node link; and
update the depth chart of each neighbor node to be updated to reflect invalid entries that have become invalid in response to failure of the node link.

9. A system on a chip (SoC) unit, comprising:
one or more processing cores configured to process information for one or more client systems; and
a management engine coupled to the one or more processing cores, wherein the management engine includes one or more management processors, a memory accessible by the one or more management processors, and instructions stored on the memory and configured to be executed by the one or more management processors, wherein the instructions, upon execution, cause the one or more management processors to:
determine routing information for neighbor nodes within a cluster of nodes;

receive neighbor node routing information from other ones of the nodes;

use the neighbor routing information to generate a depth chart containing routing information for each of the nodes in the cluster, wherein the depth chart is an array that is indexed by destination node; and generate a spanning tree representation of the cluster of nodes based on information derived from the depth chart.

10. The SoC unit of claim 9, further comprising instructions configured to cause the one or more management processors to:

propagate the neighbor node routing information received from one neighbor node to each neighbor node thereof.

11. The SoC unit of claim 10, further comprising instructions configured to cause the one or more management processors to not transmit neighbor node routing information to a node link from which the neighbor node routing information was received.

12. The SoC unit of claim 9, further comprising instructions configured to cause the one or more management processors to:

generate neighbor depth chart entries for neighbor nodes thereof; and generate the depth chart using the neighbor depth chart entries for neighbor nodes thereof and the neighbor node depth chart entries from other ones of the nodes.

13. The SoC unit of claim 12, wherein the depth chart is an aggregation of the node depth chart entries thereof and depth chart entries received thereby from neighbor nodes thereof.

14. The SoC unit of claim 12, further comprising instructions configured to cause the one or more processors to propagate the neighbor node routing information received from one neighbor node to each neighbor node thereof.

15. The SoC unit of claim 14, further comprising instructions configured to cause the one or more management processors to not transmit the neighbor node routing information on a node link from which the neighbor node routing information was received.

16. The SoC unit of claim 15, further comprising instructions configured to cause the one or more management processors to:

generate available routes between the SoC unit and other nodes using information derived from the depth chart; and rate each one of the routes to characterize routing efficiency.

17. A method performed by each one of a plurality of nodes from a cluster of nodes, the method comprising:

one or more management processors of a particular one of the nodes of the cluster accessing, from memory allocated to the one or more management processors of the particular one of the nodes, instructions to generate a neighbor depth chart;

the one or more management processors of the particular one of the nodes further accessing, from the memory allocated thereto, instructions causing the one or more management processors of the particular one of the nodes to propagate entries of the node depth chart for reception by neighbors of the particular one of the nodes;

the one or more management processors of the particular one of the nodes further accessing, from the memory allocated thereto, instructions causing the one or more management processors of the particular one of the nodes to create a depth chart for each one of the nodes using the node depth chart entries received thereby, wherein the depth chart is an aggregation of the node depth chart entries for the particular one of the nodes and depth chart entries received by the particular one of the nodes from other ones of the nodes, and wherein the depth chart is an array that is indexed by destination node; and generating, by the one more management processors, a spanning tree representation of the plurality nodes based on information derived from the depth chart.

18. The method of claim 17, wherein:

the depth chart for the particular one of the nodes includes a depth chart entry for each other one of the nodes; and the depth chart entry for each other one of the nodes includes an identifier for a respective target node, an identifier for a particular neighbor node to the target node with respect to the particular one of the nodes, and an identifier designating a hop count between the particular one of the nodes and the target node through the particular neighbor node.

19. The method of claim 18, further comprising accessing instructions to not transmit neighbor depth chart entries on a node link from which the neighbor depth chart entries were received.

20. The method of claim 17, further comprising accessing instructions to not transmit neighbor node routing information to a particular one of the neighbor nodes from which the neighbor node routing information was received.

21. The method of claim 17, further comprising accessing instructions to:

generate available routes between the particular one of the nodes and other nodes of the cluster using information derived from the depth chart; and rate each one of the routes for characterizing routing efficiency.

22. The method of claim 17, further comprising accessing instructions to:

generate available routes between the particular one of the nodes and other nodes of the cluster using information derived from the depth chart; and rate each one of the routes for characterizing routing efficiency.

23. A non-transitory computer-readable medium having tangibly embodied thereon, and accessible therefrom, a set of instructions interpretable by one or more data processing devices, wherein the set of instructions includes:

instructions to generate a node depth chart of a particular node in a plurality of nodes;

instructions to propagate entries of the node depth chart for reception by neighbors of the particular node;

instructions to create a cluster depth chart for each one of the plurality of nodes using the node depth chart entries received thereby, wherein the cluster depth chart for the particular node is an aggregation of the node depth chart entries for the particular node and depth chart entries received by the particular node from other ones of the nodes, and wherein the cluster depth chart is an array that is indexed by destination node; and instructions to generate, by a management engine of the particular node, a spanning tree representation of the plurality of nodes based on information derived from the depth chart.

24. The non-transitory computer-readable medium of claim 23, wherein:

the cluster depth chart for the particular node includes a depth chart entry for each other one of the plurality of nodes; and the depth chart entry for each other one of the plurality of nodes includes an identifier for a respective target node, an identifier for a neighbor node to the respective target node, and an identifier designating a hop count between the particular node and the respective target node through the neighbor node.

25. The non-transitory computer-readable medium of claim 24, further comprising instructions to not transmit a neighbor depth chart entry to a node link from which the neighbor depth chart entry was received.

26. The non-transitory computer-readable medium of claim 23, further comprising instructions to not transmit a neighbor depth chart entry to a node link from which the neighbor depth chart entry was received.

27. The non-transitory computer-readable medium of claim 23, further comprising:
   instructions to generate available routes between the particular node and other nodes of the cluster using information derived from the cluster depth chart; and
   instructions to rate each one of the routes to characterize routing efficiency.

\* \* \* \* \*